US012246251B2

(12) United States Patent
Gu et al.

(10) Patent No.: US 12,246,251 B2
(45) Date of Patent: Mar. 11, 2025

(54) METHOD AND APPARATUS FOR DISPLAYING VIRTUAL ITEM, ELECTRONIC DEVICE, AND STORAGE MEDIUM

(71) Applicant: Tencent Technology (Shenzhen) Company Limited, Shenzhen (CN)

(72) Inventors: Han Gu, Shenzhen (CN); Jianquan Li, Shenzhen (CN); Tao Liu, Shenzhen (CN); Liangliang Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 126 days.

(21) Appl. No.: 17/747,319

(22) Filed: May 18, 2022

(65) Prior Publication Data

US 2022/0297003 A1    Sep. 22, 2022

Related U.S. Application Data

(63) Continuation of application No. PCT/CN2021/126520, filed on Oct. 26, 2021.

(30) Foreign Application Priority Data

Mar. 22, 2021    (CN) .......................... 202110301716.5

(51) Int. Cl.
  *A63F 13/00* (2014.01)
  *A63F 13/35* (2014.01)
  (Continued)

(52) U.S. Cl.
  CPC .............. *A63F 13/52* (2014.09); *A63F 13/35* (2014.09); *A63F 13/537* (2014.09); *A63F 13/837* (2014.09)

(58) Field of Classification Search
  CPC .......... A63F 13/69; A63F 13/45; A63F 13/00; A63F 13/5333; A63F 13/60
  See application file for complete search history.

(56) References Cited

U.S. PATENT DOCUMENTS

2016/0067601 A1    3/2016  Mehra et al.
2019/0192977 A1*   6/2019  Eatedali .................. A63F 13/35
(Continued)

FOREIGN PATENT DOCUMENTS

CN     108579090 A     9/2018
CN     108671540 A     10/2018
(Continued)

OTHER PUBLICATIONS

Just Cause 4—https://youtu.be/m3pe_YHYsEM?si=2MvKxWozlqGHqfBk (Year: 2018).*
(Continued)

*Primary Examiner* — Omkar A Deodhar
*Assistant Examiner* — Eric M Thomas
(74) *Attorney, Agent, or Firm* — Crowell & Moring LLP

(57) ABSTRACT

This application discloses a method and apparatus for displaying a virtual item, an electronic device, and a storage medium, and belongs to the field of computer technologies. The method includes: displaying a virtual object in a virtual scene, the virtual object having a plurality of virtual items, and the plurality of virtual items respectively having virtual functions; and displaying a virtual combined item in the virtual scene in response to a first trigger operation targeting at least two virtual items of the plurality of virtual items, the virtual combined item being obtained by combining the at least two virtual items, and the virtual combined item supporting a new virtual function different from the virtual functions of the at least two virtual items.

21 Claims, 9 Drawing Sheets

(51) Int. Cl.
*A63F 13/52* (2014.01)
*A63F 13/537* (2014.01)
*A63F 13/837* (2014.01)

(56) References Cited

U.S. PATENT DOCUMENTS

2019/0221030 A1 7/2019 Griffin et al.
2020/0346113 A1* 11/2020 Sun .................. A63F 13/837

FOREIGN PATENT DOCUMENTS

| CN | 111111174 A | 5/2020 |
| CN | 111111195 A | 5/2020 |
| CN | 112121427 A | 12/2020 |
| CN | 112221126 A | 1/2021 |
| CN | 112316428 A | 2/2021 |
| CN | 112354188 A | 2/2021 |
| CN | 112870709 A | 6/2021 |
| JP | 2000113206 A | 4/2000 |
| JP | 2001129254 A | 5/2001 |
| JP | 2019063178 A | 4/2019 |
| TW | 202009682 A | 3/2020 |
| WO | WO 2013/191043 A1 | 12/2013 |

OTHER PUBLICATIONS

Office Action for Chinese Patent Application No. 202110301716 .5 dated Oct. 24, 2022, 13 pages.
Author: Dongsi video, Website: Haokan Video, Dec. 2, 2019, Relevant to claim No. 1-15, 1 page, https://haokan.baidu.com/v?pd=wisenatual&vid=16547379567670578513.
Office Action with English Translation for Japanese Patent Application No. 2022-562156 dated Sep. 12, 2023, 9 pages.
Office Action for Taiwanese Patent Application No. 110143420 dated Oct. 7, 2022, 15 pages.
International Search Report and Written Opinion for International Patent Agglication No. PCT/CN2021/126520 dated Jan. 26, 2022, 9 pgs.
Online video to introduce a game. Author: handsome guy loving games, Title: "Eat chicken animation: the new weapon composed oftwo pistols can be equipped with 4 glasses and can be used as a submachine gun". Date: Aug. 16, 2019. https://www.iqyi.com/v_19rt6ly0sc.html.
Korean Office Action with English translation, Aug. 5, 2024, pp. 1-19, issued in Korean Patent Application No. 10-2022-7031177.
Internet posted video (Dec. 2, 2019), <https://haokan.baidu.com/v?pd=wisenatural&vid=16547379567670578513>.
Internet posted video (Nov. 21, 2020), <https://www.youtube.com/watch?v=SXdPi65Vll0>.
Internet posted video (Mar. 14, 2021), <https://www.youtube.com/watch?v=4DouCTZJOgA>.
Search Report and Written Opinion, Dec. 31, 2024, pp. 1-9, issued in Patent Application No. 11202250547H, Intellectual Property Office of Singapore.
Essential Beginner's Guide to Fusing Gear! Watch if you are New to Fusion!, 5 pages, uploaded on Aug. 2, 2018 by user "Fishy". Retrieved from Internet: https://www.youtube.com/watch?v=klhMFKlpv0w—directed at a video about weapon fusing method.
Fortnite weapon mixer update, 4 pages, uploaded Apr. 1, 2019 by user "Lichtenstein". Retrieved from Internet: https://www.youtube.com/watch?app=desktop&v=JGj4KX2loyQ&t=0s—directed at a video about the various weapon combination method and shooting method of game application.

\* cited by examiner

METHOD AND APPARATUS FOR DISPLAYING VIRTUAL ITEM, ELECTRONIC DEVICE, AND STORAGE MEDIUM

RELATED APPLICATION

This application is a continuation application of PCT Patent Application No. PCT/CN2021/126520, filed on Oct. 26, 2021, which claims priority to Chinese Patent Application No. 202110301716.5, filed with the China National Intellectual Property Administration, PRC on Mar. 22, 2021, each of which is incorporated herein by reference in its entirety.

FIELD OF THE TECHNOLOGY

This application relates to the field of computer technologies, and in particular, to a method and apparatus for displaying a virtual item, an electronic device, and a storage medium.

BACKGROUND OF THE DISCLOSURE

With the development of the computer technologies and the diversity of terminal functions, more and more types of game can be played on a terminal. Shooting game is a type of popular game. A terminal displays a virtual scene on an interface, and displays a virtual object in the virtual scene. A user controls the virtual object to fight against another virtual object by using the terminal.

SUMMARY of this disclosure provide a method and apparatus for displaying a virtual item, an electronic device, and a storage medium, which can enrich a manner of controlling a virtual item and improve the efficiency of human-computer interaction. The technical solutions are as follows:

According to an aspect, a method for displaying a virtual item is provided, including:
  displaying a target virtual object in a virtual scene, the target virtual object having a plurality of virtual items, and the plurality of virtual items respectively having virtual functions; and
  displaying a target virtual item in the virtual scene in response to a first trigger operation on at least two virtual items of the plurality of virtual items, the target virtual item being obtained by combining the at least two virtual items, and the target virtual item having a new virtual function different from the virtual functions of the at least two virtual items.

According to an aspect, an apparatus for displaying a virtual item is provided, including:
  a first display module, configured to display a target virtual object in a virtual scene, the target virtual object having a plurality of virtual items, and the plurality of virtual items respectively having virtual functions; and
  a second display module, configured to display a target virtual item in the virtual scene in response to a first trigger operation on at least two virtual items of the plurality of virtual items, the target virtual item being obtained by combining the at least two virtual items, and the target virtual item having a new virtual function different from the virtual functions of the at least two virtual items.

In a possible implementation, the second display module includes:
  an obtaining unit, configured to obtain the target virtual item in response to the first trigger operation; and
  an assembly control unit, configured to display, in the virtual scene, that the target virtual object is equipped with the target virtual item.

In a possible implementation, the obtaining unit includes:
  an obtaining subunit, configured to combine the at least two virtual items in response to the first trigger operation, to obtain the target virtual item.

In a possible implementation, the apparatus further includes:
  transmitting a combination instruction for the at least two virtual items to a server; and
  the assembly control unit is configured to:
  display, based on confirmation information of the server for the combination instruction, that the target virtual object is equipped with the target virtual item.

In a possible implementation, the first display module is further configured to:
  display controls of the plurality of virtual items owned by the target virtual object; and
  the second display module is configured to:
  display the target virtual item in the virtual scene in response to a pinch operation on the display controls of the at least two virtual items.

In a possible implementation, the second display module is configured to:
  transmit operation information of the first trigger operation to a server in response to the first trigger operation, the operation information indicating to combine the at least two virtual items; and
  obtain the target virtual item issued by the server based on the operation information, and display the target virtual item in the virtual scene.

In a possible implementation, the second display module is configured to:
  play an item combination animation in response to the first trigger operation, the item combination animation being an animation in which the target virtual object combines the at least two virtual items into the target virtual item.

In a possible implementation, the first display module is further configured to: display a first launch function option of the target virtual item in the virtual scene; and
  the apparatus further includes:
  a launch control module, configured to control, in response to a trigger operation on the first launch function option, the target virtual object to simultaneously launch projectiles of the at least two virtual items based on the target virtual item.

In a possible implementation, the first display module is further configured to: display a second launch function option and a throwing function option of the target virtual item in the virtual scene; and
  the apparatus further includes:
  a launch control module, configured to control, in response to a trigger operation on the second launch function option, the target virtual object to launch a projectile of a shooting item of the at least two virtual items based on the target virtual item; and
  a throwing control unit, configured to control, in response to a trigger operation on the throwing function option, the target virtual object to throw a throwing item of the at least two virtual items based on the target virtual item.

In a possible implementation, the first display module is further configured to: display a third launch function option and a confrontation function option of the target virtual item in the virtual scene; and the apparatus further includes:
a launch control module, configured to control, in response to a trigger operation on the third launch function option, the target virtual object to launch a projectile of a shooting item of the at least two virtual items based on the target virtual item; and
a confrontation control unit, configured to control, in response to a trigger operation on the confrontation function option, the target virtual object to compete based on a cold weapon item of the at least two virtual items.

In a possible implementation, the first display module is further configured to: display a fourth launch function option and a fifth launch function option of the target virtual item in the virtual scene; and the apparatus further includes:
a launch control module, configured to control, in response to a trigger operation on the fourth launch function option, the target virtual object to launch a projectile of a shooting item of the at least two virtual items based on the target virtual item; and
the launch control module, being further configured to control, in response to a trigger operation on the fifth launch function option, the target virtual object to launch a target projectile based on the target virtual item.

In a possible implementation, the apparatus further includes:
an obtaining module, configured to separate the target virtual item in response to a second trigger operation on the target virtual item, to obtain the at least two virtual items.

In a possible implementation, the apparatus further includes:
a transmission module, configured to transmit a separation instruction for the target virtual item to a server; and
the second display module, being further configured to display, based on confirmation information of the server for the separation instruction, that the target virtual object is equipped with any shooting item of the at least two virtual items.

In a possible implementation, the apparatus further includes:
a separation module, configured to play an item separation animation in response to a second trigger operation on the target virtual item, the item separation animation being an animation in which the target virtual object separates the target virtual item into the at least two virtual items.

In a possible implementation, the plurality of virtual items respectively have interaction functions, the interaction function being a function for the target virtual object to interact with another virtual object in the virtual scene based on the virtual item; and the target virtual item has a new interaction function different from the interaction functions of the at least two virtual items.

According to an aspect, an electronic device is provided, including one or more processors and one or more memories, the one or more memories storing at least one computer program, the at least one computer program being loaded and executed by the one or more processors to implement the method for displaying a virtual item.

According to an aspect, a non-transitory storage medium is provided, storing at least one computer program, the computer program being loaded and executed by a processor to implement the method for displaying a virtual item.

According to an aspect, a computer program product or a computer program is provided, including one or more pieces of program code, the one or more pieces of program code being stored in a computer-readable storage medium. One or more processors of an electronic device can read the one or more pieces of program code from the non-transitory computer-readable storage medium, and the one or more processors execute the one or more pieces of program code to enable the electronic device to perform the method for displaying a virtual item.

The technical solutions provided in the embodiments of this disclosure include at least the following beneficial effects:

An interaction manner in which at least two virtual items are combined into a new target virtual item is provided, so that in a case that a target virtual item is equipped by a user, a new virtual function of the target virtual item can be realized without frequently switching virtual items in a game, thereby greatly reducing the operation difficulty of the user, enriching a manner of controlling a virtual item, and improving the efficiency of human-computer interaction.

BRIEF DESCRIPTION OF THE DRAWINGS

To describe the technical solutions in the embodiments of this disclosure more clearly, the accompanying drawings required for describing the embodiments are briefly described hereinafter. Apparently, the accompanying drawings in the following descriptions show merely some embodiments of this disclosure, and a person of ordinary skill in the art may obtain other accompanying drawings according to these accompanying drawings without creative efforts.

DESCRIPTION OF EMBODIMENTS

Figure 1:
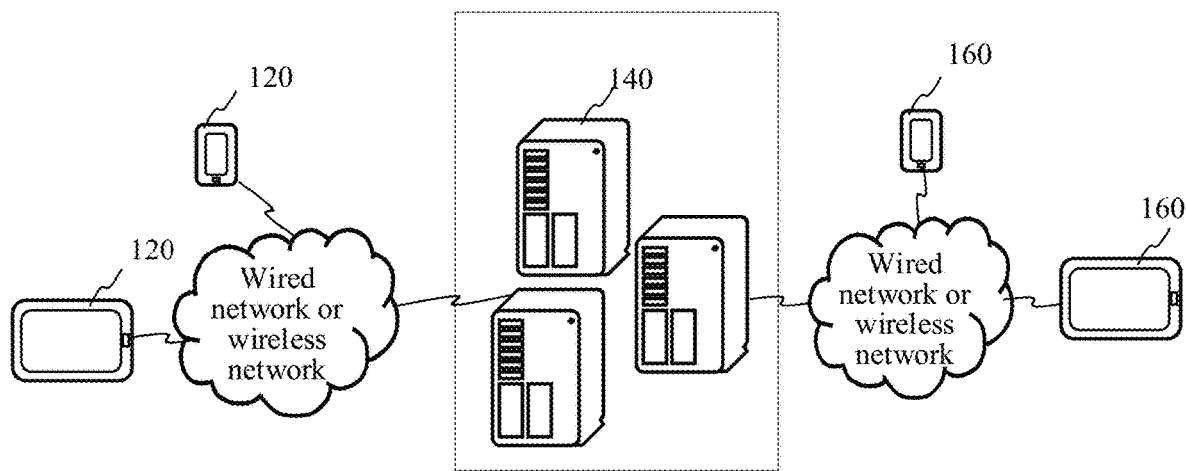
FIG. 1 is a schematic diagram of an example implementation environment of a method for displaying a virtual item according to an embodiment of this disclosure.

To make objectives, technical solutions, and advantages of this application clearer, the following further describes implementations of this application in detail with reference to the accompanying drawings.

The terms "first", "second", and the like in this application are used for distinguishing between same items or similar items of which effects and functions are basically the same. It is to be understood that, the "first", "second", and "nth" do not have a dependency relationship in logic or time sequence, and a quantity and an execution order thereof are not limited.

The term "at least one" in this application means one or more and "a plurality of" means two or more. For example, a plurality of first positions means two or more first positions.

In shooting games, a user controls a virtual object to assemble various types of virtual items, so that the virtual object can use the virtual item to compete with another virtual object in a virtual scene. For example, the types of the virtual items include shooting items such as machine guns and rifles, throwing items such as grenades, smoke bombs, and melee weapons such as daggers and bayonets.

During the foregoing process, because the virtual object is usually assembled with more than one type of virtual items in the virtual scene, the operation of switching the virtual items by the virtual object is cumbersome, and a manner of controlling a virtual item is very limited, resulting in low efficiency in human-computer interaction.

Terms used in this application are explained in the following.

Virtual scene: a virtual scene displayed (or provided) when an application program is run on a terminal. Optionally, the virtual scene is a simulated environment of a real world, or a semi-simulated semi-fictional virtual environment, or an entirely fictional virtual environment. Optionally, the virtual scene is any one of a two-dimensional virtual scene, a 2.5-dimensional virtual scene, or a three-dimensional virtual scene, and the dimension of the virtual scene is not limited in the embodiments of this disclosure. For example, the virtual scene includes the sky, the land, the ocean, or the like. The land includes environmental elements such as the desert and a city. The user can control the virtual object to move in the virtual scene.

Virtual object: a movable object in a virtual scene. The movable object may include a virtual character, a virtual animal, a cartoon character, or the like, for example, a character, an animal, a plant, an oil drum, a wall, or a stone displayed in a virtual scene. The virtual object may include a virtual image used for representing a user in the virtual scene. The virtual scene may also include a plurality of virtual objects, and each virtual object has a shape and a volume in the virtual scene, and occupies some space in the virtual scene. When the virtual scene is a three-dimensional virtual scene, the virtual object may include a three-dimensional model. The three-dimensional model may include a three-dimensional character constructed based on three-dimensional human skeleton technology. The same virtual object may show different external appearances by wearing different skins/outfits. In some embodiments, the virtual object can be alternatively implemented by using a 2.5-dimensional model or a two-dimensional model, which is not limited in the embodiments of this disclosure.

The virtual object may also include a player character controlled through an operation on a client, or is a non-player character (NPC) set in a virtual scene. Optionally, the virtual object is a virtual character performing sports in the virtual scene. Optionally, a quantity of virtual objects participating in the interaction in the virtual scene is preset, or is dynamically determined according to a quantity of clients participating in the interaction.

Shooting game (STG): a type of game in which a virtual object uses virtual items of hot weapons for long-range attack. The STG is a type of action game with obvious features of action games. The STGs include, but are not limited to first-person shooter (FPS) games, third-person shooter games, top-down shooter games, head-up shooter games, platform shooter games, scrolling shooter games, light gun shooter games, mouse and keyboard shooter games, shooting range games, tactical shooter games, and the like. The types of shooting games are not specifically limited in the embodiments of this disclosure.

First-person shooter (FPS): an STG in which a user can play in a first-person perspective. A picture of a virtual scene in the game is a picture of the virtual scene observed with a perspective of a virtual object controlled by a terminal. In the game, at least two virtual objects play in a single-round battle in the virtual scene. The virtual object eludes damage from other virtual objects and dangers (for example, a poison gas area and a swamp) in the virtual scene to survive in the virtual scene. When a health point of the virtual object in the virtual scene is zero, the life of the virtual object in the virtual scene ends, and the final virtual object surviving in the virtual scene wins. Optionally, the battle starts with a moment when the first terminal joins the battle, and ends with a moment when the last terminal exits the battle. Each terminal controls one or more virtual objects in the virtual scene. Optionally, arena modes of the battle include a single-player battle mode, a two-player team battle mode, a multi-player team battle mode, or the like. The battle mode is not specifically limited in the embodiments of this disclosure.

For example, in an STG, the user can control the virtual object to fall freely, glide, open a parachute to fall, or the like in the sky of the virtual scene, or run, jump, crawl, bend forward, or the like on the land, or can control the virtual object to swim, float, dive, or the like in the ocean. Certainly, the user can alternatively control the virtual object to drive a virtual vehicle to move in the virtual scene, for example, the virtual vehicle is a virtual car, a virtual aircraft, or a virtual yacht. Herein, the foregoing scene is merely used as an example for description, which is not specifically limited in the embodiments of this disclosure. The user can also control the interaction of the virtual object by fighting against another virtual object through virtual items, for example, the virtual items are throwing items such as grenades, cluster mines, sticky grenades, and laser trip mines, or shooting items such as machine guns, pistols, rifles, and sentry guns, or cold weapon items such as daggers and bayonets for melee attack.

A system architecture involved in this application is described below.

FIG. 1 is a schematic diagram of an example implementation environment of a method for displaying a virtual item according to an embodiment of this disclosure. Referring to FIG. 1, the implementation environment includes a first terminal 120, a server 140, and a second terminal 160.

An application program supporting a virtual scene is installed and run on the first terminal 120. The application program may include any one of an FPS game, a third-person shooter game, a multiplayer online battle arena (MOBA) game, a virtual reality application program, a three-dimensional map program, a military simulation program, or a multiplayer gunfight survival game. In some embodiments, the first terminal 120 is a terminal used by a first user. When the first terminal 120 runs the application program, a screen of the first terminal 120 displays a user interface (UI) of the application program, and a virtual scene is loaded and displayed on the application program based on an opening operation of the first user on the UI. The first user uses the first terminal 120 to control a first virtual object in the virtual scene to perform a movement. The movement includes, but is not limited to, at least one of body posture adjustment, crawling, walking, running, cycling, jumping, driving, picking-up, shooting, attacking, throwing, fighting, or confrontation. Exemplarily, the first virtual object is a first virtual character, such as a simulated character role or a cartoon character role.

The first terminal 120 and the second terminal 160 are directly or indirectly connected to the server 140 by using a wireless network or a wired network.

The server 140 includes at least one of one server, a plurality of servers, a cloud computing platform, or a virtualization center. The server 140 is configured to provide a backend service for an application program supporting a virtual scene. Optionally, the server 140 is responsible for primary computing work, and the first terminal 120 and the second terminal 160 are responsible for secondary computing work; or the server 140 is responsible for secondary computing work, and the first terminal 120 and the second terminal 160 are responsible for primary computing work; or the server 140, the first terminal 120 and the second terminal 160 perform collaborative computing by using a distributed computing architecture among each other.

Optionally, the server 140 is an independent physical server, or is a server cluster or a distributed system formed by a plurality of physical servers, or is a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

An application program supporting a virtual scene is installed and run on the second terminal 160. Optionally, the application program includes any one of an FPS game, a third-person shooter game, a MOBA game, a virtual reality application program, a three-dimensional map program, a military simulation program, or a multiplayer gunfight survival game. In some embodiments, the second terminal 160 is a terminal used by a second user. When the second terminal 160 runs the application program, a screen of the second terminal 160 displays a UI of the application program, and a virtual scene is loaded and displayed on the application program based on a start operation of the second user on the UI. The second user uses the second terminal 160 to control a second virtual object in the virtual scene to perform a movement. The movement includes, but is not limited to, at least one of body posture adjustment, crawling, walking, running, cycling, jumping, driving, picking-up, shooting, attacking, throwing, fighting, or confrontation. Exemplarily, the second virtual object is a second virtual character, such as a simulated character role or a cartoon character role.

The first virtual object controlled by the first terminal 120 and the second virtual object controlled by the second terminal 160 may be located in the same virtual scene, and in this case, the first virtual object can interact with the second virtual object in the virtual scene.

The first virtual object and the second virtual object may be in a hostile relationship, for example, the first virtual object and the second virtual object belong to different camps. The virtual objects in the hostile relationship may interact with each other in battle by shooting each other on the land, such as shooting items to each other. In some other embodiments, the first virtual object and the second virtual object are in a teammate relationship. For example, the first virtual character and the second virtual character belong to the same camp, or the same team, have a friend relationship, or have a temporary communication permission.

The application programs installed on the first terminal 120 and the second terminal 160 may be the same, or the application programs installed on the first terminal 120 and the second terminal 160 may be the same type of application programs in different operating system platforms. The first terminal 120 may generally refer to one of a plurality of terminals, the second terminal 160 generally refers to one of a plurality of terminals, and this embodiment is described only by using the first terminal 120 and the second terminal 160 as an example. The first terminal 120 and the second terminal 160 are of the same or different device types. The device type includes at least one of a smartphone, a tablet computer, a smart speaker, a smartwatch, a laptop computer, or a desktop computer, but is not limited thereto. For example, the first terminal 120 and the second terminal 160 are the smartphones or other hand-held portable game devices. The following embodiment is described by using an example in which the terminal includes a smartphone.

A person skilled in the art may learn that there may be more or fewer terminals. For example, there is only one terminal, or there are tens of or hundreds of or more terminals. The quantity and the device types of the terminals are not limited in the embodiments of this disclosure.

Figure 2:
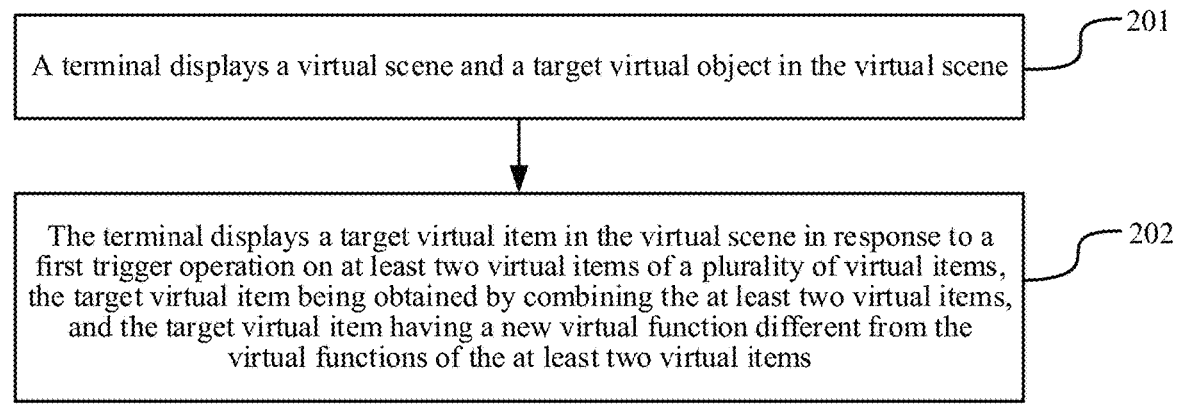
FIG. 2 is a flowchart of a method for displaying a virtual item according to an embodiment of this disclosure.

FIG. 2 is a flowchart of a method for displaying a virtual item according to an embodiment of this disclosure. Referring to FIG. 2, the method is performed by an electronic device. Descriptions are made by using an example in which the electronic device is a terminal. The terminal may be the first terminal 120 or the second terminal 160 shown in FIG. 1. This embodiment includes the following steps.

201. The terminal displays a virtual scene and a target virtual object in the virtual scene. That is, the target virtual object is displayed in the virtual scene.

The target virtual object is a virtual object currently manipulated by the terminal, which may also be referred to as a master virtual object.

An application program supporting a virtual scene may be installed on the terminal, so that the terminal can load and display the virtual scene and the target virtual object in the virtual scene in the application program. In a possible implementation, if the application program is an FPS game, when displaying a virtual scene, the terminal displays a picture of observing the virtual scene from the perspective of the target virtual object, which can facilitate the target virtual object to complete shooting from a first-person perspective.

In some embodiments, the terminal starts the application program in response to a start operation on the application program by a user. The start operation may include that the user performs a touch operation on the icon of the application program on the terminal desktop, or the user enters a start instruction for the application program to a smart voice assistant. The start instruction may also include a voice instruction or a text instruction, and types of the start instructions are not specifically limited in the embodiments of this disclosure.

In some embodiments, the user sets an automatic start condition for the application program. When the terminal detects an automatic start condition that conforms to the application program, the terminal automatically starts the application program based on an operating system. Optionally, the automatic start condition is to periodically start the application program, for example, the application program is started at 8 o'clock every night, or the automatic starting condition is to automatically start the application program. The automatic start condition of the application program is not specifically limited in the embodiments of this disclosure.

In the foregoing process, the terminal starts the application program, and displays a UI in the application program. The UI includes a selection control of a game mode, a setting control of an account option, a selection control of a virtual scene, and the like. Optionally, the terminal detects a selection operation of the user on each game mode in the UI in real time, and determines a selected game mode as a game mode configured for this game. Optionally, the selection operation is a tap/click operation, a long-press operation, or the like, or is a trigger operation of a shortcut key corresponding to any game mode, which is not limited in the embodiments of this disclosure. After selecting a game mode in the UI, the user can perform a trigger operation on an opening option, to trigger the terminal to start a game, load a virtual scene, and display a target virtual object in the virtual scene.

In the embodiments of this disclosure, the target virtual object has been equipped with a plurality of virtual items, that is, the target virtual object has a plurality of virtual items, and to be specific, the target virtual object can use the plurality of virtual items. The plurality of virtual items respectively have virtual functions. For example, the plurality of virtual items respectively have interaction functions, the interaction function being a function for the target virtual object to interact with another virtual object in the virtual scene based on the virtual item. That is, a virtual object can interact with another virtual object in the virtual scene based on the virtual function of the virtual item, which is equivalent to that the plurality of virtual items respectively have interaction functions. For example, the virtual item is a virtual firearm, and a virtual function of the virtual firearm is that the virtual firearm shoots bullets, and the target virtual object can shoot another virtual object in the virtual scene using the virtual firearm, that is, the target virtual object interacts with another virtual object based on the virtual firearm.

In a possible implementation, the target virtual object may be equipped with any one of the plurality of virtual items. The target virtual object is equipped with any virtual item, that is, the target virtual object holds the virtual item, and the target virtual object can interact based on the equipped virtual item. For example, the virtual item equipped by the target virtual object is a virtual firearm, and the target virtual object can shoot based on the virtual firearm; or the virtual item equipped by the target virtual object is a virtual grenade, and the target virtual object can throw the virtual grenade. For another virtual item of the plurality of virtual items other than the virtual item equipped by the target virtual object, the another virtual item may be stored in a virtual backpack of the target virtual object, or the another virtual item is suspended on the target virtual object. For example, the another virtual item is a grenade, and the grenade is hung on the waist of the target virtual object; or the another virtual item is a virtual firearm, and the target virtual object carries the virtual firearm on the back.

Types of the virtual items may include but are not limited to at least one of shooting items, throwing items, cold weapon items, or target projectiles, for example, the shooting items include machine guns, rifles, and the like, the throwing items include grenades, smoke bombs, and the like, the cold weapon items include daggers, bayonets, and the like, and the target projectiles include some ammunition with special effects which may be fired by a missile, a gun, etc. Optionally, the special effects are additional attack effects such as burning effects, freezing for deceleration, and armor penetration. The types of the virtual items are not specifically limited in the embodiments of this disclosure.

In some embodiments, display controls of the virtual items owned by the target virtual object are displayed in the virtual scene, and the display controls are used for representing a specific type of virtual items owned by the target virtual object. An interaction control of a virtual item equipped by the target virtual object may be further displayed in the virtual scene, and the interaction control is configured to trigger an interaction function of the corresponding virtual item.

In an example, an interaction control corresponding to a shooting item is a launch function option (or a launch function control) of the shooting item. The launch function option is used for controlling the target virtual object to launch a loaded projectile based on the shooting item, and launch the projectile to a position indicated by an aiming point of the shooting item. The projectile is a bullet, ammunition, or the like. The launch function option is also referred to as a "fire button".

In an example, an interaction control corresponding to a throwing item is a throwing function option of the throwing item, and the throwing function option is used for controlling the target virtual object to throw the throwing item to a direction the target virtual object faces.

In an example, an interaction control corresponding to a cold weapon item is a confrontation (or fighting) function option of the cold weapon item, and the confrontation function option is used for controlling the target virtual object to use the cold weapon item to initiate a confrontation behavior in a direction the target virtual object faces. For example, the confrontation behavior is that the target virtual object stabs the cold weapon item in the direction the target virtual object faces.

In an example, an interaction control corresponding to a target projectile is a target launch function option of the target projectile. The target launch function option is used for controlling the target virtual object to launch the target projectile based on the shooting item, and launch the target projectile to a position indicated by an aiming point of the shooting item. Optionally, the target projectile is special ammunition. For example, the target projectile is ammunition with burning damage, ammunition with freezing for deceleration, and ammunition that can penetrate armor.

In some embodiments, an orientation of the target virtual object in the virtual scene is a direction the target virtual object faces. Using an example in which the virtual scene is a three-dimensional virtual scene, the terminal obtains a projection direction of the target virtual object in a horizontal direction in a three-dimensional coordinate system, and determines the orientation of the target virtual object based on the projection direction. For example, when the target virtual object is standing, squatting, jumping, or floating in the virtual scene, a direction from the feet of the target virtual object to the head of the target virtual object is determined, and a projection direction of the determined direction in the horizontal direction in the three-dimensional coordinate system is used as the orientation of the target virtual object. When the virtual scene is a two-dimensional virtual scene, the orientation of the target virtual object is a direction the target virtual object faces, which is not specifically limited in the embodiments of this disclosure.

In some embodiments, the orientation of the target virtual object in the virtual scene is determined by a touch operation on a joystick control by the user. The user presses the joystick control and rotates the joystick control in a specified direction, and the terminal adjusts the direction the target virtual object faces in the virtual scene based on a pressing trajectory of the user, so that a rotation angle of the direction being faced corresponds to an angle between a starting point and an end point of the pressing trajectory, and the direction the target virtual object faces is adjusted. The joystick control is configured to control the target virtual object to move in the virtual scene.

202. The terminal displays a target virtual item in the virtual scene in response to a first trigger operation on at least two virtual items of the plurality of virtual items, the target virtual item being obtained by combining the at least two virtual items, and the target virtual item having a new virtual function different from the virtual functions of the at least two virtual items.

In this embodiment of this disclosure, the target virtual object has a plurality of virtual items, and the user can combine any two or more virtual items of the plurality of virtual items to obtain a target virtual item, that is, the target virtual item can be formed by at least two virtual items. The target virtual item has a new virtual function, and the new virtual function is different from the virtual function of each virtual item forming the target virtual item, that is, the new virtual function of the target virtual item is different from the virtual function of each of the at least two virtual items. The target virtual item may have a new interaction function that is different from interaction functions of at least two virtual items, and the new interaction function is a function of the target virtual object interacting with another virtual object in the virtual scene based on the target virtual item. That is, the target virtual object can interact with another virtual object in the virtual scene based on the virtual function of the target virtual item, which is equivalent to that the target virtual item has the new interaction function. The new virtual function may include the virtual function of each virtual item forming the target virtual item. For example, the target virtual item is formed by a virtual firearm and a virtual grenade, a virtual function of the virtual firearm is that bullets can be shot based on the virtual firearm, and a virtual function of the virtual grenade is that the virtual grenade can be thrown and explodes after being thrown. The new virtual function of the target virtual item includes shooting bullets based on the virtual firearm, or throwing the virtual grenade, where the virtual grenade explodes after being thrown, that is, the new virtual function of the target virtual item includes the virtual function of each virtual item forming the target virtual item. The target virtual object can interact with another virtual object in the virtual scene based on the new virtual function of the target virtual item, which is equivalent to that the target virtual item has the new interaction function.

In some embodiments, step 202 includes: displaying the target virtual item in the virtual scene in response to a pinch operation on the display controls of the at least two virtual items. On the basis of displaying the display controls of the plurality of virtual items owned by the target virtual object, a combination instruction for at least two virtual items to be combined can be conveniently triggered by pinching display controls of the at least two virtual items, ensuring the convenience of combining the virtual items.

In some embodiments, an example in which the at least two virtual items are two virtual items is used for description. The first trigger operation is that the user respectively presses the display controls of the two virtual items with two fingers, and performs a pinch operation on the display controls of the two virtual items. The pinch operation is that the user keeps two fingers in contact with the screen on the basis of pressing the display controls of the virtual items, and then closes the two fingers, which is similar to an operation of "pinching" the two display controls together.

Only two virtual items are used as an example for description in the foregoing process. The quantity of at least two virtual items may be three or more. The user presses the display controls of a corresponding quantity of virtual items with three or more fingers, and performs the pinch operation on the display controls of the corresponding quantity of virtual items, to implement the first trigger operation on the three or more virtual items, which is not specifically limited in the embodiments of this disclosure.

In some embodiments, the terminal detects a press operation of the user on the display controls of the at least two virtual items by using a pressure sensor disposed on a lower layer of a display screen, and when a press duration of the press operation exceeds a duration threshold, the terminal confirms that the press operation of the user on the display controls of the at least two virtual items is detected. Further, the terminal continues to detect, by using the pressure sensor, whether the user generates a pinch operation. Optionally, a detection manner of the pinch operation includes: determining, for each virtual item and by using the pressure sensor, a movement trajectory of a pressure point of a press operation applied by the user on the display control corresponding to the virtual item, determining a termination position of the movement trajectory corresponding to each virtual item, and determining, if a distance between each two of a plurality of determined termination positions is less than a distance threshold, that the pinch operation of the user on the display controls of the at least two virtual items is detected. Optionally, on the basis of detecting the press operation and the pinch operation, it is determined that the user performs the first trigger operation on the at least two virtual items.

Figure 3:
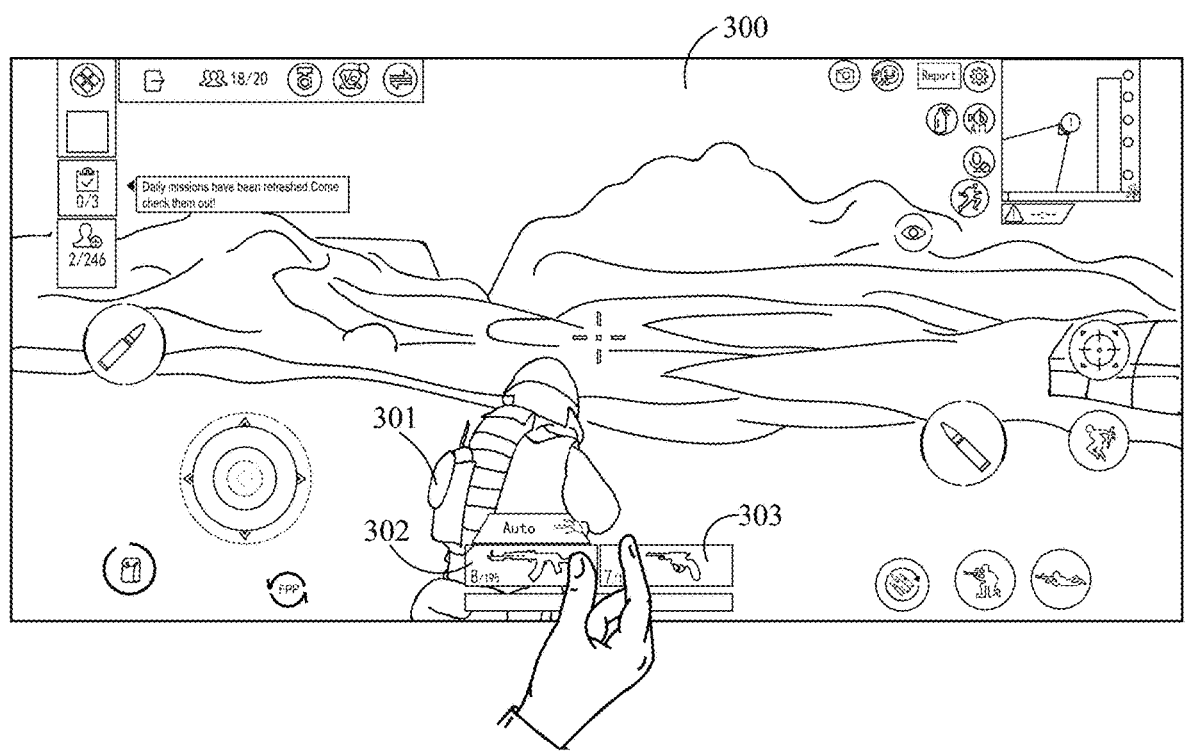
FIG. 3 is a schematic diagram of a first trigger operation according to an embodiment of this disclosure.

FIG. 3 is a schematic diagram of a first trigger operation according to an embodiment of this disclosure. Referring to FIG. 3, a target virtual object 301 is displayed in a virtual scene 300, and the target virtual object currently has two virtual items. Therefore, a display control 302 and a display control 303 of the two virtual items are further displayed in the virtual scene 300. The user respectively presses the display control 302 and the display control 303 with two fingers, and performs a pinch operation on the display control 302 and the display control 303. After detecting the press operation and the pinch operation by using a pressure sensor disposed on a lower layer of a display screen, the terminal determines that the user performs the first trigger operation on the at least two virtual items.

In some embodiments, in addition to the press operation and the pinch operation, the first trigger operation can also be that the user simultaneously taps/clicks the display controls of the at least two virtual items to be combined. The manner of the first trigger operation is not specifically limited in the embodiments of this disclosure.

In some embodiments, after detecting the first trigger operation, the terminal obtains the target virtual item in response to the first trigger operation; and displays, in the virtual scene, that the target virtual object is equipped with the target virtual item. In the foregoing process, the target virtual item formed by the combination of the at least two virtual items are first obtained, the target virtual object is then controlled to equip the target virtual item, and the target virtual object can be equipped with a new target virtual item with a new virtual function, so that the target virtual object does not need to tediously switch virtual items to realize different virtual functions during a battle. In a case of equipping the target virtual item, the virtual functions of all the virtual items forming the target virtual item are realized directly based on the target virtual item, which greatly improves the efficiency of human-computer interaction.

In some embodiments, when the terminal obtains the target virtual item in response to the first trigger operation on at least two virtual items of the plurality of virtual items, it indicates that the user expects to combine the at least two virtual items, so that the at least two virtual items are combined to form the target virtual item. In the combination process, when the first trigger operation on at least two virtual items of the plurality of virtual items is detected, it indicates that the user expects to combine the at least two virtual items, and the terminal can obtain the target virtual items in time by directly combining the at least two virtual items, without the need for the terminal to interact with the server. Obtaining the target virtual item through interaction with the server can save the communication overhead between the terminal and the server, thereby improving the efficiency of human-computer interaction.

In some embodiments, when obtaining the target virtual item, the terminal obtains a combination instruction for the at least two virtual items in response to the first trigger operation; and combines the at least two virtual items in response to the combination instruction, to obtain the target virtual item. In the foregoing process, the terminal can generate the combination instruction based on the first trigger operation, and obtain the target virtual item based on the combination instruction, which can ensure that the target virtual item has a new virtual function that is different from the virtual functions of the at least two virtual items.

In some embodiments, the foregoing combination process can be performed in a background, and a combined target virtual item is displayed in a foreground, that is, after the user performs the first trigger operation, the terminal directly controls, after determining the target virtual item in the background, the target virtual object to equip the target virtual item, and displays a display control and an interaction control of the target virtual item in the virtual scene, which can save the processing resources of the terminal.

In some embodiments, in the foregoing combination process, a visual combination picture can be presented in the foreground by playing an item combination animation, that is, the terminal plays the item combination animation in response to the first trigger operation on the at least two virtual items of the plurality of virtual items, the item combination animation being an animation in which the target virtual object combines the at least two virtual items into the target virtual item. An interaction effect of combining the at least two virtual items into the target virtual item can be intuitively displayed to the user by playing the item combination animation, thereby improving the intuitiveness and interestingness of the combination process, and improving the efficiency of human-computer interaction.

In some embodiments, the terminal transmits, when controlling the target virtual object to equip the target virtual item, the combination instruction for the at least two virtual items to the server; and displays, based on confirmation information of the server for the combination instruction, that the target virtual object is equipped with the target virtual item. That is, the terminal synchronizes the combination instruction of the user for the at least two virtual items to the server, so that the server records the combination of the at least two virtual items by the target virtual object controlled by the terminal, and sets the target virtual item to be in an equipped state. The equipped state indicates that the target virtual object has been equipped with the target virtual item, thereby implement data synchronization between the terminal and the server. The confirmation information indicates that the server has confirmed the combination of at least two virtual items into the target virtual item.

Any combination of all the foregoing optional technical solutions may be used to form an optional embodiment of the present disclosure, and details are not described herein again.

In the method provided in the embodiments of this disclosure, an interaction manner in which at least two virtual items are combined into a new target virtual item is provided, so that in a case that the target virtual item is equipped by the user, a new virtual function of the target virtual item can be realized without frequently switching the virtual items in a game, thereby greatly reducing the operation difficulty of the user, enriching a manner of controlling a virtual item, and improving the efficiency of human-computer interaction.

Figure 4:
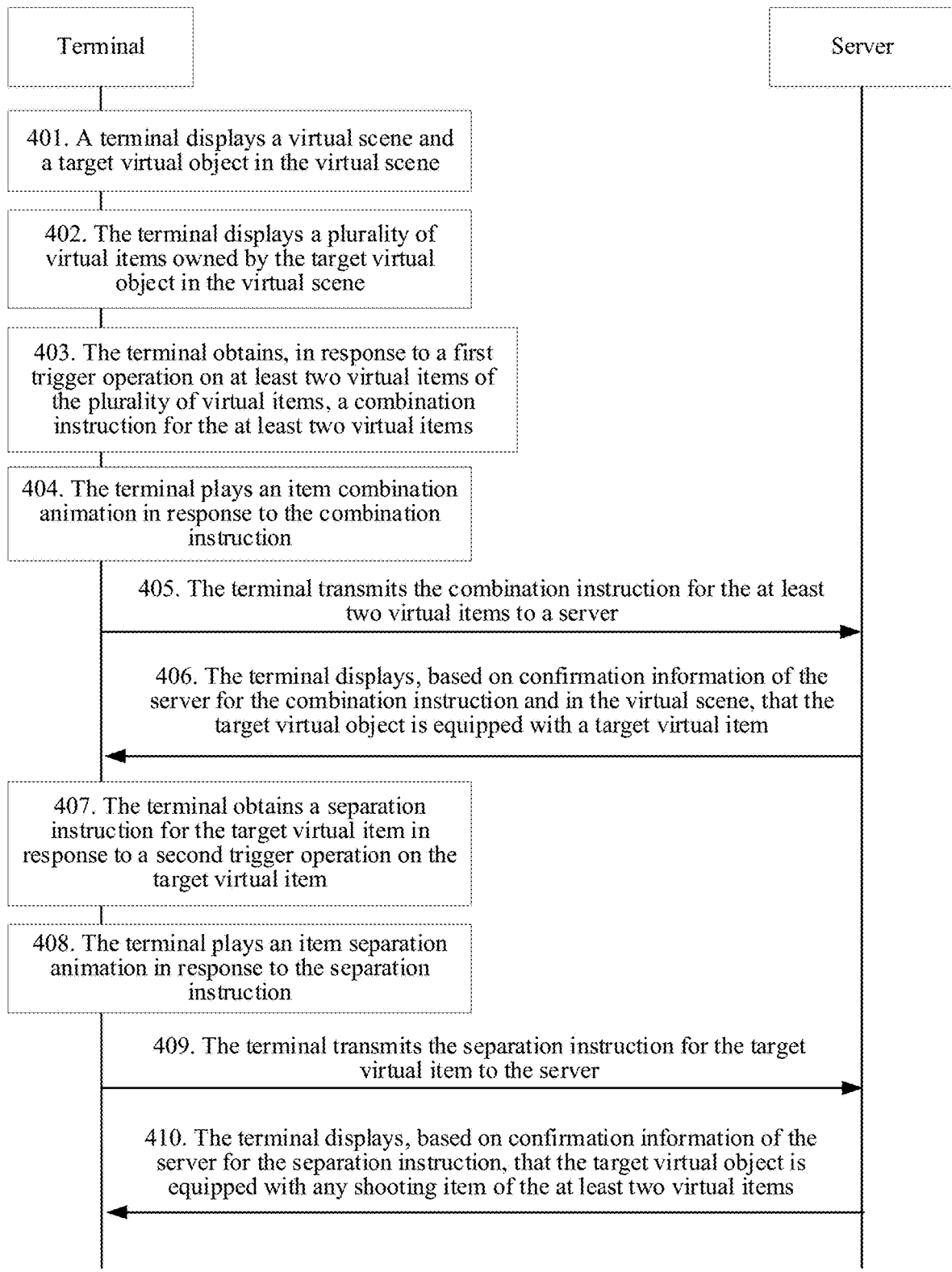
FIG. 4 is a flowchart of a method for displaying a virtual item according to an embodiment of this disclosure.

FIG. 4 is a flowchart of a method for displaying a virtual item according to an embodiment of this disclosure. Referring to FIG. 4, the method is performed by an electronic device. Descriptions are made by using an example in which the electronic device is a terminal. The terminal is the first terminal 120 or the second terminal 160 shown in FIG. 1. This embodiment includes the following steps.

401. The terminal displays a virtual scene and a target virtual object in the virtual scene.

402. The terminal displays a plurality of virtual items owned by the target virtual object in the virtual scene.

Step 401 and step 402 are similar to step 201, and details are not described herein again.

In this embodiment of this disclosure, an example in which the terminal displays the target virtual object and displays the plurality of virtual items owned by the target virtual object is used for description. However, in another embodiment, the plurality of virtual items owned by the target virtual object may not be displayed, that is, step 401 and step 402 can be replaced by the following step: The terminal displays a target virtual object in a virtual scene, the target virtual object having a plurality of virtual items.

403. The terminal obtains, in response to a first trigger operation on at least two virtual items of the plurality of virtual items, a combination instruction for the at least two virtual items.

For the introduction of the first trigger operation, reference may be made to the previous embodiment, and details are not described herein again.

In some embodiments, the terminal generates the combination instruction for the at least two virtual items based on the first trigger operation, the combination instruction includes item identifiers of the at least two virtual items and combination indication information for the at least two virtual items, and the combination indication information indicates to combine the at least two virtual items.

404. The terminal plays an item combination animation in response to the combination instruction, the item combination animation being an animation in which the target virtual object combines the at least two virtual items into the target virtual item.

The target virtual item is obtained by combining the at least two virtual items, and the target virtual item has a new virtual function different from the virtual functions of the at least two virtual items.

In some embodiments, the terminal invokes a playback control of an application program to play the item combination animation, and configures item combination animations with different contents according to combination manners of different types of virtual items.

In some embodiments, an example in which the two virtual items are combined is used. In a shooting game, a virtual item held by the target virtual object in a default state is referred to as a primary weapon, and the virtual item that needs to be switched to be used is referred to as a secondary weapon. The terminal combines the primary weapon and the secondary weapon into the target virtual item.

In one implementation, when both the primary weapon and the secondary weapon are shooting items, the item combination animation is that the target virtual object takes out a shooting item (such as a machine gun) from a backpack, aligns the shooting item with another held shooting item (such as a rifle), and then completes a combination action, that is, the shooting item is bound on the side of the another shooting item to obtain a target virtual item. In other words, the rifle and the machine gun are combined to form an enhanced rifle. Subsequently, the terminal may control the target virtual object to use the target virtual item for shooting. When shooting, bullets in two shooting items can be shot simultaneously until ammunition is exhausted or the user triggers a separation instruction for the target virtual item.

For a combination manner of the two shooting items, reference may be made to FIG. 3. Both the display control 302 and the display control 303 shown are two different types of shooting items. The display control 302 shows a primary weapon rifle, and the display control 303 shows a secondary weapon machine gun.

In one implementation, when the primary weapon is a shooting item and the secondary weapon is a throwing item, the item combination animation is that the target virtual object takes out a throwing item (such as a grenade) from a backpack, inserts the throwing item into a slot under a barrel of a shooting item (such as a rifle), and then completes a combination action, to obtain a target virtual item. In other words, the rifle and the grenade are combined to form a rifle with a grenade launcher. Subsequently, the terminal may control the target virtual object to use the target virtual item to shoot bullets in the shooting item, and may also control the target virtual object to use the target virtual item to directly shoot the throwing item.

Figure 5:
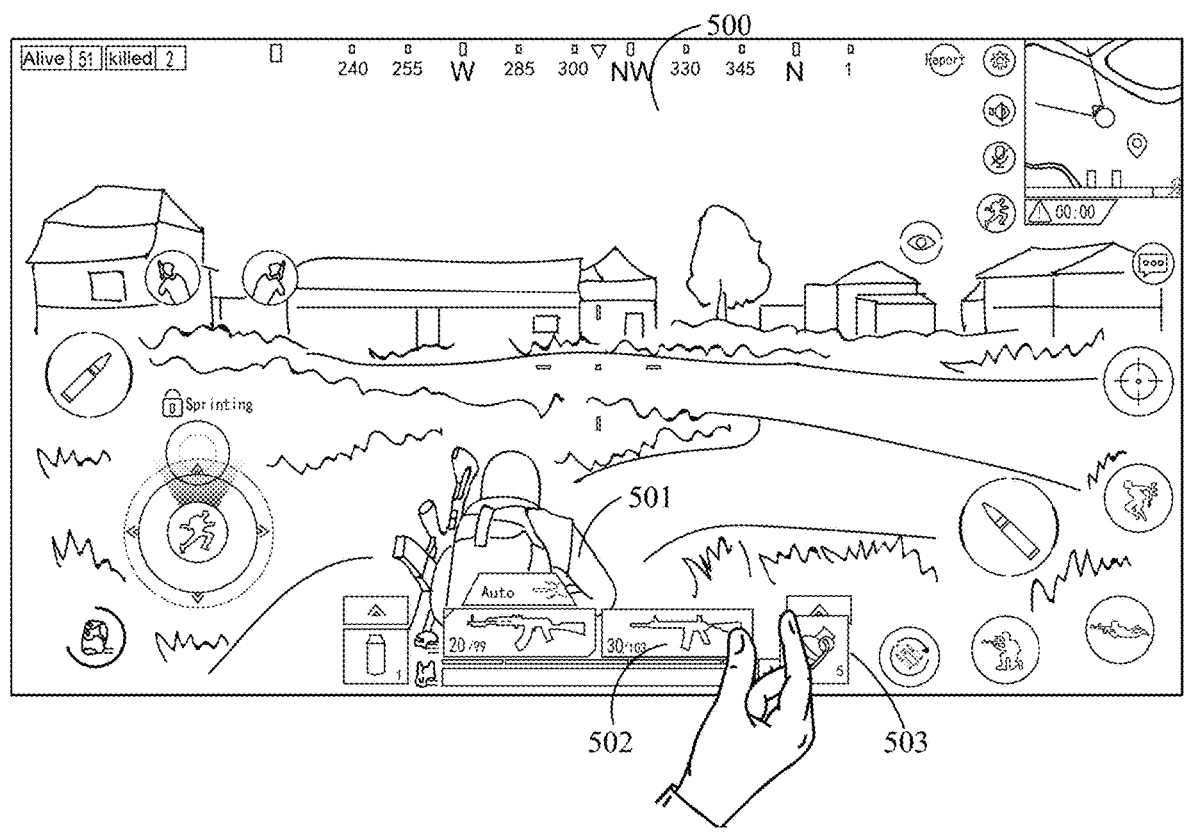
FIG. 5 is a schematic diagram of a combination manner of virtual items according to an embodiment of this disclosure.

FIG. 5 is a schematic diagram of a combination manner of virtual items according to an embodiment of this disclosure. For a combination manner of a shooting item and a throwing item, reference may be made to FIG. 5. A target virtual object 501 is displayed in a virtual scene 500, and the target virtual object 501 is currently equipped with a shooting item and a throwing item. Therefore, a display control 502 of the shooting item and a display control 503 of the throwing item are further displayed in the virtual scene 500. An example in which the shooting item is a rifle and the throwing item is a grenade is merely used for description herein. When a user performs a first trigger operation on (presses and pinches) the display control 502 and the display control 503, the terminal combines the rifle with the grenade to form a rifle with a grenade launcher.

Figure 6:
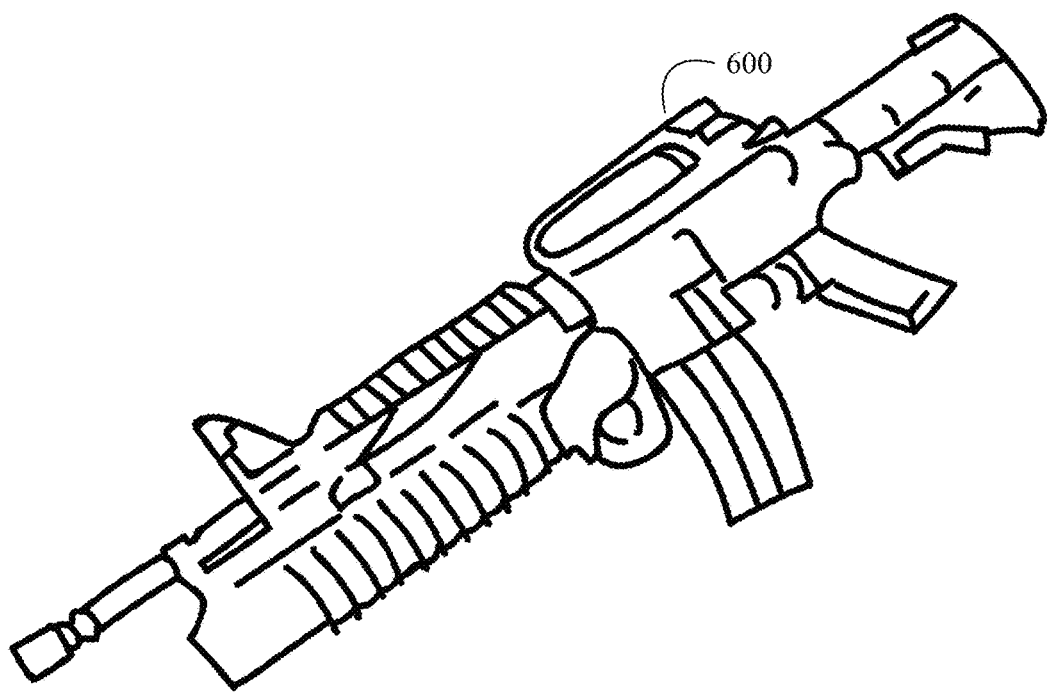
FIG. 6 is a schematic diagram of a target virtual item according to an embodiment of this disclosure.

FIG. 6 is a schematic diagram of a target virtual item according to an embodiment of this disclosure. As shown in FIG. 6, a target virtual item 600 is shown by using an example in which a shooting item is combined with a throwing item. In this example, the target virtual item 600 is formed by a rifle and a grenade, and is a rifle with a grenade launcher.

In one implementation, when the primary weapon is a shooting item and the secondary weapon is a cold weapon item, the item combination animation is that the target virtual object takes out a cold weapon item (such as a dagger) from a backpack, inserts the cold weapon item into a slot under a barrel of a shooting item (such as a rifle), and then completes a combination action, to obtain a target virtual item. In other words, the rifle and the dagger are combined to form a rifle with a dagger at the muzzle. Subsequently, the terminal may control the target virtual object to use the target virtual item to shoot bullets in the shooting item, and may also control the target virtual object to use the target virtual item to directly perform a confrontation action based on the cold weapon item, for example, the target virtual object is allowed to complete a confrontation behavior based on dagger thrusting between firing and shooting.

Figure 7:
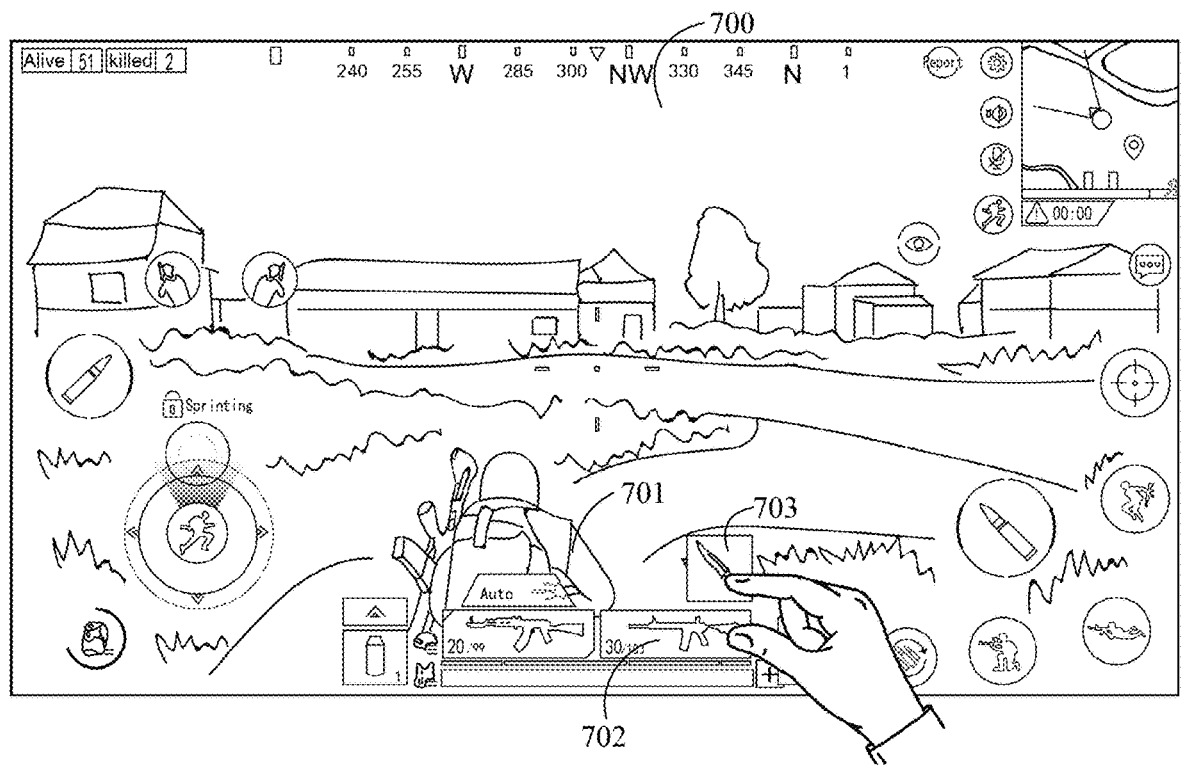
FIG. 7 is a schematic diagram of a combination manner of virtual items according to an embodiment of this disclosure.

FIG. 7 is a schematic diagram of a combination manner of virtual items according to an embodiment of this disclosure. For a combination manner of a shooting item and a cold weapon item, reference may be made to FIG. 7. A target virtual object 701 is displayed in a virtual scene 700, and the target virtual object 701 currently has a shooting item and a cold weapon item. Therefore, a display control 702 of the shooting item and a display control 703 of the cold weapon item are further displayed in the virtual scene 700. An example in which the shooting item is a rifle and the cold weapon item is a dagger is merely used for description herein. When a user performs a first trigger operation on (presses and pinches) the display control 702 and the display control 703, the terminal combines the rifle with the dagger to form a rifle with a dagger at the muzzle.

Figure 8:
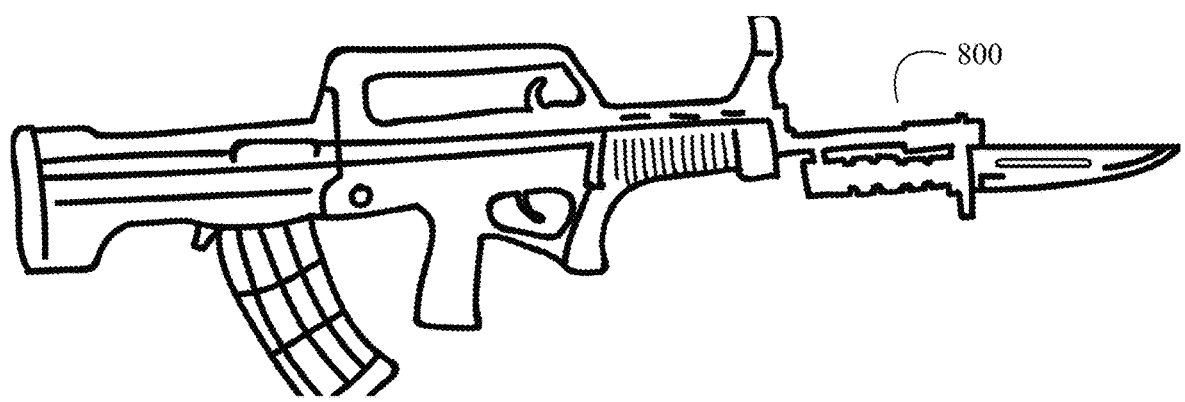
FIG. 8 is a schematic diagram of a target virtual item according to an embodiment of this disclosure.

FIG. 8 is a schematic diagram of a target virtual item according to an embodiment of this disclosure. As shown in FIG. 8, a target virtual item 800 is shown by using an example in which a shooting item is combined with a cold weapon item. The target virtual item 800 is formed by a rifle and a dagger, and is a rifle with a dagger at the muzzle.

Optionally, when the primary weapon is a shooting item and the secondary weapon is a target projectile, the item combination animation is that the target virtual object takes out a target projectile (such as a special magazine) from a backpack, inserts the target projectile into a magazine compartment of a shooting item (such as a rifle), and then completes a combination action, to obtain a target virtual item. In other words, the rifle and the magazine are combined to form a rifle loaded with special ammunition, and the special ammunition may have additional attack effects such as burning damage, freezing for deceleration, and armor penetration. Subsequently, the terminal may control the target virtual object to use the target virtual item to shoot original bullets in the shooting item, and may also control the target virtual object to use the target virtual item to launch the target projectile, for example, the target virtual object is allowed to shoot with the special ammunition.

Figure 9:
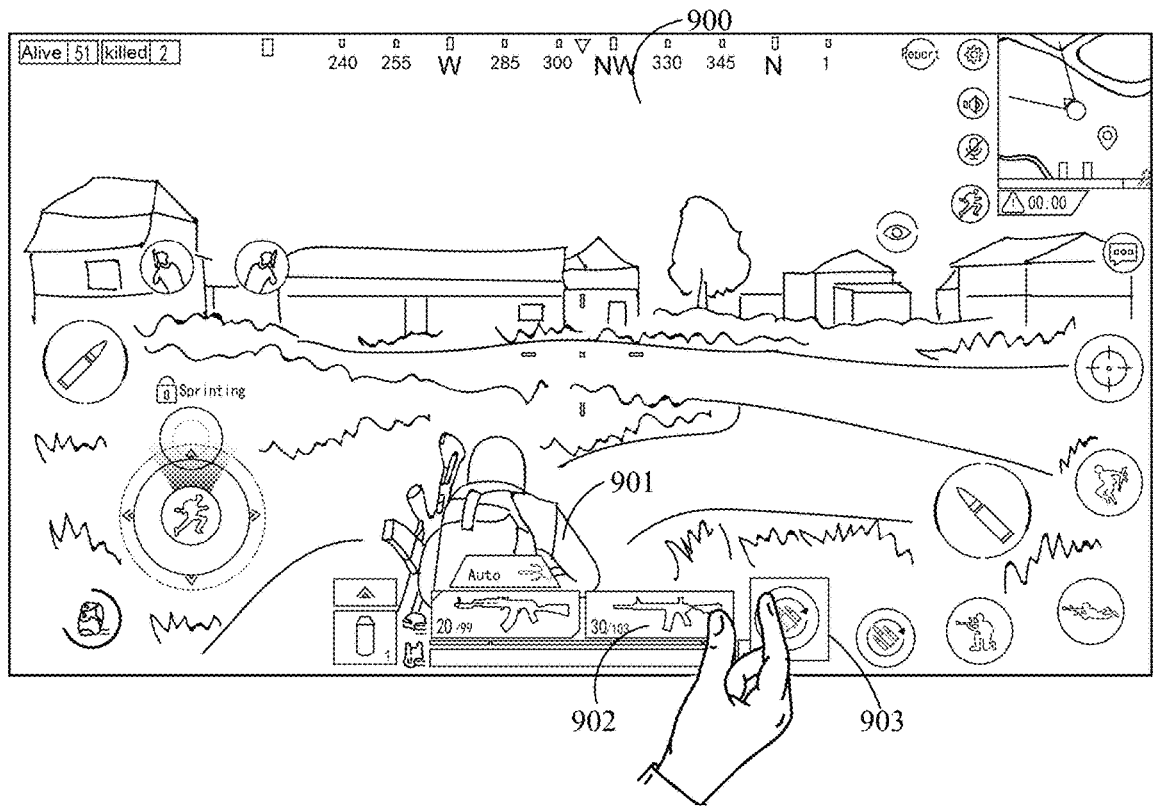
FIG. 9 is a schematic diagram of a combination manner of virtual items according to an embodiment of this disclosure.

FIG. 9 is a schematic diagram of a combination manner of virtual items according to an embodiment of this disclosure. For a combination manner of a shooting item and a target projectile, reference may be made to FIG. 9. A target virtual object 901 is displayed in a virtual scene 900, and the target virtual object 901 currently has a shooting item and a target projectile. Therefore, a display control 902 of the shooting item and a display control 903 of the target projectile are further displayed in the virtual scene 900. An example in which the shooting item is a rifle and the target projectile is special ammunition is merely used for description herein. When a user performs a first trigger operation on (presses and pinches) the display control 902 and the display control 903, the terminal loads the rifle with the special ammunition, so that the rifle can be used to shoot the special ammunition to complete shooting.

Step 404 is further a possible implementation in which the terminal combines the at least two virtual items in response to the combination instruction, to obtain the target virtual item. In this case, the terminal presents the combination process of the target virtual item in the foreground by playing the item combination animation, to implement efficient interaction with the user, thereby improving the efficiency of human-computer interaction. In some other embodiments, the terminal can place the combination process of the target virtual item in the background. In this case, there is no need to play the item combination animation, and the terminal displays a display control of the combined target virtual item in direct response to the first trigger operation.

In step 403 and step 404, the terminal obtains the target virtual item in response to the first trigger operation, which can save communication overhead between the terminal and the server. In some embodiments, the terminal can also transmit operation information of the first trigger operation to the server, and obtains the target virtual item issued by the server. A manner of obtaining the target virtual item is not specifically limited in the embodiments of this disclosure, which can save the processing resources of the terminal.

In some embodiments, a process of obtaining the target virtual item through an interaction between the terminal and the server includes: transmitting, by the terminal, the operation information of the first trigger operation to the server in response to the first trigger operation, obtaining, by the terminal, the target virtual item issued by the server based on the operation information, and displaying the target virtual item in the virtual scene.

The operation information indicates to combine at least two virtual items. In one implementation, the operation information includes item identifiers of at least two virtual items and combination indication information for the at least two virtual items, and the combination indication information indicates to combine the at least two virtual items. After receiving the operation information transmitted by the terminal, the server combines the at least two virtual items into a target virtual item based on the operation information, and transmits the target virtual item to the terminal. The terminal receives the target virtual item and displays the target virtual item in the virtual scene. Through the interaction between the terminal and the server, the terminal transmits the operation information of the first trigger operation to the server, the server generates the target virtual item based on the operation information, and then the server transmits the target virtual item to the terminal, without the need for the terminal to generate the target virtual item based on the operation information, thereby saving the processing resources of the terminal.

In this embodiment of this disclosure, the combination instruction is first obtained in response to the first trigger operation, and the item combination animation is played based on the combination instruction. However, in another embodiment, there is no need to perform step 403 and step 404, and another manner can be used to play the item combination animation in response to the first trigger operation.

405. The terminal transmits the combination instruction for the at least two virtual items to the server.

In some embodiments, after completing the combination of the at least two virtual items to form the target virtual item, the terminal needs to synchronize the combination behavior with the server. Therefore, the terminal transmits the combination instruction in step 403 to the server.

406. The terminal displays, based on confirmation information of the server for the combination instruction and in the virtual scene, that the target virtual object is equipped with the target virtual item.

In some embodiments, the server records the combination instruction and stores behavior information that the target virtual object combines the at least two virtual items into the target virtual item. The behavior information needs to be synchronized to other terminals participating in the game. Optionally, a frame synchronization technology is used in information synchronization.

In step 405 and step 406, the terminal displays, in the virtual scene, that the target virtual object is equipped with the target virtual item. That is, the operation of the terminal controlling the target virtual object to equip the target virtual item needs to be confirmed by the server, otherwise, if the server returns rejection information for the combination instruction, it means that the target virtual object fails to equip the target virtual item and still maintains a state of having the plurality of virtual items. In this case, combination failure prompt information can be displayed in the virtual scene, and the combination failure prompt information is used for prompting the user to re-perform the first trigger operation.

In step 403 to step 406, the terminal displays the target virtual item in the virtual scene in response to the first trigger operation on at least two virtual items of the plurality of virtual items. In some other embodiments, in addition to synchronizing the combination manner of the virtual items to the server by using the combination instruction, the terminal can also synchronize the combination manner of the virtual items to the server by transmitting the operation information of the first trigger operation to the server, which is not specifically limited in the embodiments of this disclosure.

In some embodiments, when the terminal displays, in the virtual scene, that the target virtual object is equipped with the target virtual item, the terminal displays the display control of the target virtual item in the virtual scene. In addition, based on different combination manners of the at least two virtual items that form the target virtual item, the terminal displays different types of interaction controls for the target virtual item formed in different combination manners, which is described in detail below.

Case I: Both the at Least Two Virtual Items are Shooting Items

Optionally, the terminal displays a first launch function option of the target virtual item in the virtual scene; and controls, in response to a trigger operation on the first launch function option, the target virtual object to simultaneously launch projectiles of the at least two virtual items based on the target virtual item.

In a case that both the at least two virtual items that are combined into the target virtual item are the shooting items, projectiles of a plurality of shooting items can be simultaneously launched using a launch function option of the target virtual item, that is, a function that projectiles of a plurality of virtual items are launched by one virtual item (target virtual item) is realized, which enriches the functions of the virtual items in the virtual scene, and also enriches the diversity of the virtual items, so that the virtual functions of the at least two virtual items can be realized in a case that the user equips the target virtual item, and there is no need to frequently switch the virtual items used in the game, thereby greatly reducing the operation difficulty of the user, enriching a manner of controlling a virtual item, and improving the efficiency of human-computer interaction.

Optionally, the trigger operation includes but is not limited to: a tap/click operation, a long-press operation, a double-tap/click operation, a voice instruction, a text instruction, or the like, which is not specifically limited in the embodiments of this disclosure.

In one implementation, the first launch function option is a graphic button, or a function option in a menu bar, where the graphic button is a circular button, or a square button, or an irregular-shaped button, which is not specifically limited in the embodiments of this disclosure.

In one implementation, when launching the projectiles of the at least two virtual items, using an example in which the projectile is a bullet, the target virtual object can simultaneously launch the bullets of each virtual item, that is, a multi-shot mode of bullets is adopted. Alternatively, the target virtual object can also launch bullets of one virtual item first until the bullets are exhausted, and then launch bullets of another virtual item until the bullets of all virtual items are exhausted, that is, a single-shot mode of bullets is adopted. The shot mode of bullets is not specifically limited in the embodiments of this disclosure.

In one implementation, when the target virtual object launches the projectiles of the at least two virtual items, a launch trajectory is formed based on parameters of the at least two virtual items and by using a current position of the target virtual object as a starting point and a position corresponding to an aim point of a viewing angle of the target virtual object as an end point, and the target virtual object controls the projectile to move along the launch trajectory in the virtual scene, so that a movement process of the projectile can be displayed. The parameters of the virtual items include a range parameter, a caliber parameter, and the like. The range parameter is used for representing a range of the virtual item, and the caliber parameter is used for representing a muzzle size of the virtual item, which can also represent a size of the projectile of the virtual item.

In an exemplary scenario, the at least two virtual items are a rifle and a machine gun, the target virtual item is an enhanced rifle, and the first launch function option is a fire button. The user may control, by performing a trigger operation on the fire button, the target virtual object to simultaneously shoot bullets in the machine gun and the rifle based on the target virtual item, until the bullets are exhausted or the user triggers a separation instruction for the target virtual item.

Case II: The at Least Two Virtual Items Include a Shooting Item and a Throwing Item Optionally, the terminal displays a second launch function option and a throwing function option of the target virtual item in the virtual scene; controls, in response to a trigger operation on the second launch function option, the target virtual object to launch a projectile of the shooting item of the at least two virtual items using the target virtual item; and controls, in response to a trigger operation on the throwing function option, the target virtual object to throw the throwing item of the at least two virtual items using the target virtual item.

In a case that the at least two virtual items that are combined into the target virtual item are a shooting item and a throwing item, functions of different types of virtual items of the target virtual item can be triggered by using two different function options of the target virtual item, so that the virtual functions of the at least two virtual items can be realized in a case that the user equips the target virtual item, and there is no need to frequently switch the virtual items used in the game, thereby greatly reducing the operation difficulty of the user, enriching a manner of controlling a virtual item, and improving the efficiency of human-computer interaction.

In one implementation, the trigger operation includes but is not limited to: a tap/click operation, a long-press operation, a double-tap/click operation, a voice instruction, a text instruction, or the like, which is not specifically limited in the embodiments of this disclosure.

In one implementation, the second launch function option or the throwing function option is a graphic button, or a function option in a menu bar, where the graphic button is a circular button, or a square button, or an irregular-shaped button, which is not specifically limited in the embodiments of this disclosure.

In one implementation, when the target virtual object launches a projectile of the shooting item based on the target virtual item, a single-shot mode or a multi-shot mode can be adopted. The shot mode of the projectile is not specifically limited in the embodiments of this disclosure.

In one implementation, when the target virtual object launches the projectile of the shooting item based on the target virtual item, a launch trajectory is formed based on parameters of the shooting item and by using a current position of the target virtual object as a starting point and a position corresponding to an aim point of a viewing angle of the target virtual object as an end point, and the target virtual object controls the projectile to move along the launch trajectory in the virtual scene, so that a movement process of the projectile can be displayed.

In one implementation, when the target virtual object throws the throwing item based on the target virtual item, a throwing trajectory is formed based on parameters of the throwing item and by using a current position of the target virtual object as a starting point and a position corresponding to an aim point of a viewing angle of the target virtual object as an end point, and the target virtual object controls the throwing item to move along the throwing trajectory in the virtual scene, so that a movement process of the throwing item can be displayed. The parameters of the throwing item include a weight, a size, and the like.

In an exemplary scenario, the at least two virtual items are a rifle and a grenade, the target virtual item is a rifle with a grenade launcher, the second launch function option is a fire button, and the throwing function option is a special fire button. The user controls, by performing a trigger operation on the fire button, the target virtual object to use the rifle to shoot, and controls, by performing a trigger operation on the special fire button, the target virtual object to throw the grenade.

Case III: The at Least Two Virtual Items Include a Shooting Item and a Cold Weapon Item Optionally, the terminal displays a third launch function option and a confrontation function option of the target virtual item in the virtual scene; controls, in response to a trigger operation on the third launch function option, the target virtual object to launch a projectile of the shooting item of the at least two virtual items based on the target virtual item; and controls, in response to a trigger operation on the confrontation function option, the target virtual object to compete based on the cold weapon item of the at least two virtual items.

In a case that the at least two virtual items that are combined into the target virtual item are a shooting item and a cold weapon item, functions of different types of virtual items of the target virtual item can be triggered by using two different function options of the target virtual item, so that the virtual functions of the at least two virtual items can be realized in a case that the user equips the target virtual item, and there is no need to frequently switch the virtual items used in the game, thereby greatly reducing the operation difficulty of the user, enriching a manner of controlling a virtual item, and improving the efficiency of human-computer interaction.

In one implementation, the trigger operation includes but is not limited to: a tap/click operation, a long-press operation, a double-tap/click operation, a voice instruction, a text instruction, or the like, which is not specifically limited in the embodiments of this disclosure.

In one implementation, the third launch function option or the confrontation function option is a graphic button or a function option in a menu bar. The graphic button is a circular button, or a square button, or an irregular-shaped button, which is not specifically limited in the embodiments of this disclosure.

In one implementation, when the target virtual object launches a projectile of the shooting item based on the target virtual item, a single-shot mode or a multi-shot mode can be adopted. The shot mode of the projectile is not specifically limited in the embodiments of this disclosure.

In one implementation, when the target virtual object launches the projectile of the shooting item based on the target virtual item, a launch trajectory is formed based on parameters of the shooting item and by using a current position of the target virtual object as a starting point and a position corresponding to an aim point of a viewing angle of the target virtual object as an end point, and the target virtual object controls the projectile to move along the launch trajectory in the virtual scene, so that a movement process of the projectile can be displayed.

In one implementation, when the target virtual object uses a cold weapon item for confrontation, using a position of the target virtual object as a starting point, the target virtual object is controlled to use the cold weapon item to stab from the starting point to a direction indicated by a joystick control, so that a movement process of the cold weapon item can be displayed.

In an exemplary scenario, the at least two virtual items are a rifle and a dagger, the target virtual item is a rifle with a dagger at the muzzle, the third launch function option is a fire button, and the confrontation function option is a special fire button. The user controls, by performing a trigger operation on the fire button, the target virtual object to use the rifle to shoot, and controls, by performing a trigger operation on the special fire button, the target virtual object to use the dagger to perform a confrontation behavior (such as stabbing).

Case IV: the at Least Two Virtual Items Include a Shooting Item and a Target Projectile In one implementation, the terminal displays a fourth launch function option and a fifth launch function option of the target virtual item in the virtual scene; controls, in response to a trigger operation on the fourth launch function option, the target virtual object to launch a projectile of the shooting item of the at least two virtual items based on the target virtual item; and controls, in response to a trigger operation on the fifth launch function option, the target virtual object to launch the target projectile based on the target virtual item. In this case, the throwing item may include a rifle and it may throw its own projectile, as well as the target projectile, such as a grenade.

In a case that the at least two virtual items that are combined into the target virtual item include a shooting item and a target projectile, a function that the shooting item launches two different projectiles can be realized using two different function options of the target virtual item, which enriches the functions of the virtual items in the virtual scene, and also enriches the diversity of the virtual items, so that the virtual functions of the at least two virtual items can be realized in a case that the user equips the target virtual item, and there is no need to frequently switch the virtual items used in the game, thereby greatly reducing the operation difficulty of the user, enriching a manner of controlling a virtual item, and improving the efficiency of human-computer interaction.

In response to the trigger operation on the fifth launch function option, the target virtual object is controlled to launch the projectile based on the target virtual item, that is, launch the target projectile based on the shooting item. In this case, a projectile of the shooting item is not launched. For example, the projectile of the shooting item is ordinary ammunition of a virtual firearm, and the target projectile is special ammunition with burning damage. In response to the trigger operation on the fourth launch function option, the target virtual object is controlled to launch the ordinary ammunition of the virtual firearm of the at least two virtual items based on the target virtual item. In response to the trigger operation on the fifth launch function option, the target virtual object is controlled to launch the special ammunition based on the target virtual item.

In one implementation, the trigger operation includes but is not limited to: a tap/click operation, a long-press operation, a double-tap/click operation, a voice instruction, a text instruction, or the like, which is not specifically limited in the embodiments of this disclosure.

In one implementation, the fourth launch function option or the fifth launch function option is a graphic button or a function option in a menu bar. The graphic button is a circular button, or a square button, or an irregular-shaped button, which is not specifically limited in the embodiments of this disclosure.

In one implementation, when the target virtual object launches the projectile of the shooting item and or the target projectile based on the target virtual item, a single-shot mode or a multi-shot mode can be adopted. The shot mode of the projectile is not specifically limited in the embodiments of this disclosure.

In one implementation, when the target virtual object launches the projectile of the shooting item or the target projectile based on the target virtual item, a launch trajectory is formed based on parameters of the shooting item and by using a current position of the target virtual object as a starting point and a position corresponding to an aim point of a viewing angle of the target virtual object as an end point, and the target virtual object controls the projectile of the shooting item or the target projectile to move along the launch trajectory in the virtual scene, so that a movement process of the projectile or the target projectile can be displayed.

In an exemplary scenario, the at least two virtual items are a rifle and special ammunition, the target virtual item is a rifle loaded with both special ammunition and conventional ammunition, the fourth launch function option is a fire button, and the fifth launch function option is a special fire button. The user controls, by performing a trigger operation on the fire button, the target virtual object to use the rifle to launch the conventional ammunition, and controls, by performing a trigger operation on the special fire button, the target virtual object to use the rifle to launch the special ammunition.

Figure 10:
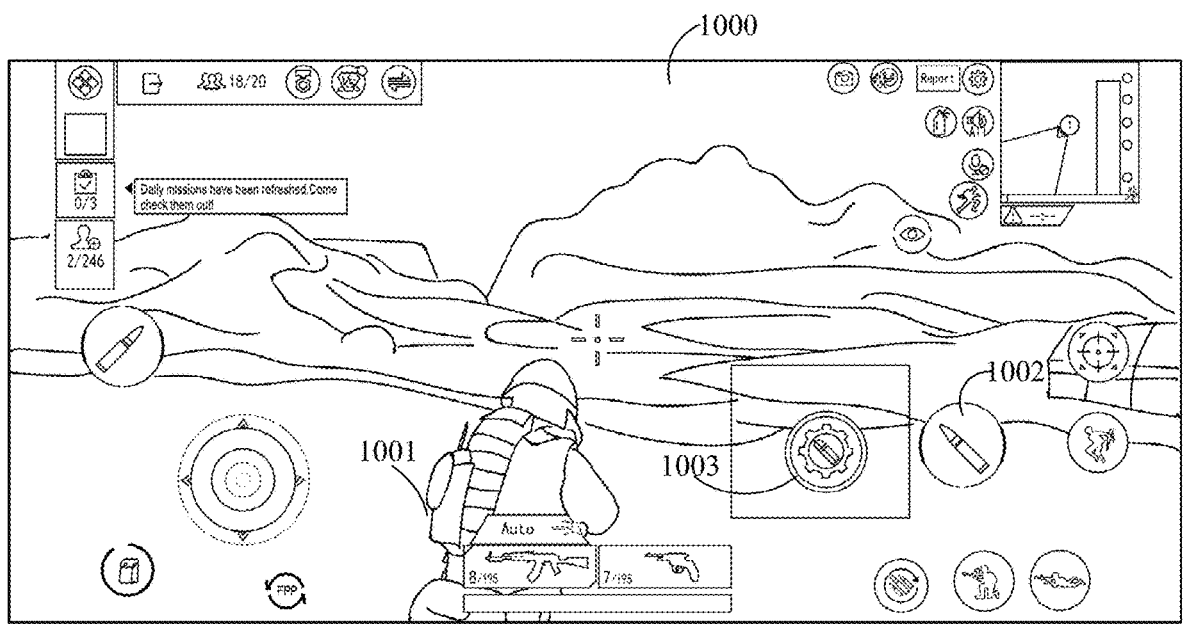
FIG. 10 is a schematic diagram of a target launch function option according to an embodiment of this disclosure.

FIG. 10 is a schematic diagram of a target launch function option according to an embodiment of this disclosure. Referring to FIG. 10, a target virtual object 1001 is displayed in a virtual scene 1000. The target virtual object has a shooting item and a target projectile. The user combines the shooting item and the target projectile by triggering a first trigger operation, to form a target virtual item. In this case, a fourth launch function option 1002 and a fifth launch function option 1003 of the target virtual item are further displayed in the virtual scene 1000. The fourth launch function option 1002 is used for controlling the target virtual object to use the target virtual item to launch a default projectile (that is, conventional ammunition) of the shooting item, and the fifth launch function option 1003 is used for controlling the target virtual object to use the target virtual item to launch the target projectile (that is, special ammunition).

407. The terminal obtains a separation instruction for the target virtual item in response to a second trigger operation on the target virtual item.

In some embodiments, an example in which two virtual items are combined into a target virtual item is used for description. The second trigger operation is that the user simultaneously presses the display controls of the target virtual item with two fingers, and performs a separation operation using the two fingers. The separation operation is that the user keeps two fingers in contact with the screen on the basis of pressing the display controls of the target virtual item, and then separates the two fingers (that is, the two fingers are respectively dragged in two different directions), that is, a relative movement is performed between the two fingers with increasing distance.

In the foregoing process, an example in which only two virtual items are combined into the target virtual item is used for description. A quantity of at least two virtual items actually used to form the target virtual item is three or more. Therefore, when the user simultaneously presses the display controls of the target virtual item with three or more fingers, and then drags the display controls in three or more different directions, the second trigger operation can also be realized, which is not specifically limited in the embodiments of this disclosure.

In some embodiments, the terminal detects a press operation of the user on the display controls of the target virtual item by using a pressure sensor disposed on a lower layer of a display screen, and when a press duration of the press operation exceeds a duration threshold, the terminal confirms that the press operation of the user on the display control of the target virtual item is detected. Further, the terminal continues to detect, by using the pressure sensor, whether the user generates a separation operation. Optionally, a detection manner of the separation operation includes: determining, by using the pressure sensor, a movement trajectory of a pressure point of a press operation applied by each finger of the user on the display controls of the target virtual item, and determining, if a distance between each two of termination positions of a plurality of movement trajectories corresponding to a plurality of fingers is greater than a distance threshold (or a trajectory length of each movement trajectory is greater than a length threshold), that the separation operation of the user on the target virtual item is detected. Optionally, on the basis of detecting the press operation and the separation operation, it is determined that the user performs the second trigger operation on the target virtual item.

In some embodiments, the terminal generates the separation instruction for the target virtual item based on the second trigger operation, the separation instruction includes item identifiers of at least two virtual items that form the target virtual item and separation indication information for the target virtual item, and the separation indication information indicates to separate the target virtual item into at least two virtual items.

408. The terminal plays an item separation animation in response to the separation instruction, the item separation animation being an animation in which the target virtual object separates the target virtual item into the at least two virtual items.

In some embodiments, the terminal invokes a playback control of an application program to play the item separation animation, and configures item separation animations with different contents according to combination manners of different types of virtual items.

In some embodiments, an example in which two virtual items are combined into a target virtual item is used. Generally, in a shooting game, a virtual item held by the target virtual object in a default state is referred to as a primary weapon, and the virtual item that needs to be switched to be used is referred to as a secondary weapon. The terminal can combine the primary weapon and the secondary weapon into the target virtual item.

In one implementation, when the primary weapon and the secondary weapon are shooting items, the item separation animation is that the target virtual object uses hands to separate the target virtual item, and puts one of the shooting items (usually a secondary weapon, such as a machine gun) into the backpack, and returns to a state of holding another shooting item (usually a primary weapon, such as a rifle), to complete a separation action on the target virtual item.

In one implementation, when the primary weapon is a shooting item and the secondary weapon is a throwing item, the item separation animation is that the target virtual object takes out a throwing item (such as a grenade) from a slot under a muzzle of the shooting item (such as a rifle), puts the throwing item into the backpack, and returns to a state of holding only the shooting item, to complete a separation action on the target virtual item.

In one implementation, when the primary weapon is a shooting item and the secondary weapon is a cold weapon item, the item separation animation may be that the target virtual object takes out a cold weapon item (such as a dagger) from a slot under a muzzle of the shooting item (such as a rifle), puts the cold weapon item into the backpack, and returns to a state of holding only the shooting item, to complete a separation action on the target virtual item.

In one implementation, when the primary weapon is a shooting item and the secondary weapon is a target projectile, the item separation animation may be that the target virtual object takes out a target projectile (such as a special magazine for special ammunition) from a magazine compartment of the shooting item (such as a rifle), puts the target projectile into the backpack, and returns to a state of holding only the shooting item, to complete a separation action on the target virtual item.

Step 408 is further a possible implementation in which the terminal separates the target virtual item in response to the separation instruction, to obtain the at least two virtual items. In this case, the terminal presents the separation process of the target virtual item in the foreground by playing the item separation animation, to implement efficient interaction with the user, thereby improving the efficiency of human-computer interaction. In some other embodiments, the terminal can also place the separation process of the target virtual item in the background. In this case, there is no need to play the item separation animation, and the terminal displays display controls of the at least two separated virtual items in direct response to the second trigger operation.

In step 407 and step 408, the terminal generates the separation instruction based on the second trigger operation, and splits out the at least two virtual items based on the separation instruction, which can ensure that the original respective virtual functions of the at least two virtual items are still maintained after the target virtual item is split into the at least two virtual items.

In this embodiment of this disclosure, the separation instruction is first obtained in response to the second trigger operation, and the item separation animation is played based on the separation instruction. However, in another embodiment, there is no need to perform step 407 and step 408, and another manner can be used to play the item separation animation in response to the second trigger operation on the target virtual item.

In this embodiment of this disclosure, the separation instruction is first obtained in response to the second trigger operation, and the item separation animation is played based on the separation instruction. However, in another embodiment, there is no need to perform step 407 and step 408, and another manner can be used to separate the target virtual item in response to the second trigger operation on the target virtual item, to obtain the at least two virtual items. In the separation process, when the second trigger operation on the target virtual item is detected, it indicates that the user expects to separate the target virtual item into at least two virtual items, and the target virtual item is directly separated, so that the terminal can obtain the at least two separated virtual items in time without the need for the terminal to interact with the server. Splitting the target virtual item through interaction with the server can save the communication overhead between the terminal and the server, thereby improving the efficiency of human-computer interaction.

409. The terminal transmits the separation instruction for the target virtual item to the server.

In some embodiments, after completing the separation of the target virtual item into the at least two virtual items, the terminal needs to synchronize the separation behavior with the server. Therefore, the terminal can transmit the separation instruction in step 407 to the server.

410. The terminal displays, based on confirmation information of the server for the separation instruction, that the target virtual object is equipped with any shooting item of the at least two virtual items.

The confirmation information indicates that the server has confirmed the separation of the target virtual item into at least two virtual items. In this embodiment of this disclosure, the target virtual item is formed by at least two virtual items, and the at least two virtual items include at least one shooting item. After the target virtual item is split, the target virtual object has the at least two virtual items and is equipped with any shooting item of the at least two virtual items. Optionally, the shooting item is a shooting item equipped before the target virtual object combines at least two virtual items. Optionally, after the target virtual item is split, the target virtual object is equipped with any shooting item of at least two virtual items and stores the remaining virtual items in a virtual backpack of the target virtual object. In a case that the separation instruction for the target virtual item is transmitted to the server through the terminal, and only the server has confirmed that the target virtual item has been separated into at least two virtual items, the shooting item that is of the separated virtual items and that is equipped by the target virtual object is displayed, to ensure data synchronization between the terminal and the server.

In some embodiments, the server records the separation instruction and stores behavior information that the target virtual object separates the target virtual item into the at least two virtual items. The behavior information needs to be synchronized to other terminals participating in the game. Optionally, a frame synchronization technology may be used in information synchronization.

In step 409 and step 410, the operation of the terminal controlling the target virtual object to split the target virtual item into at least two virtual items needs to be confirmed by the server, otherwise, if the server returns rejection information for the separation instruction, it means that the target virtual object fails to split the target virtual item into at least two virtual items and still maintains a state of equipping the target virtual item. In this case, separation failure prompt information is displayed in the virtual scene, and the separation failure prompt information is used for prompting the user to re-perform the second trigger operation.

Any combination of all the foregoing optional technical solutions may be used to form an optional embodiment of the present disclosure, and details are not described herein again.

In the method provided in the embodiments of this disclosure, an interaction manner in which at least two virtual items are combined into a new target virtual item is provided, so that in a case that the target virtual item is equipped by the user, a new virtual function of the target virtual item can be realized without frequently switching the virtual items in a game, thereby greatly reducing the operation difficulty of the user, enriching a manner of controlling a virtual item, and improving the efficiency of human-computer interaction.

Figure 11:
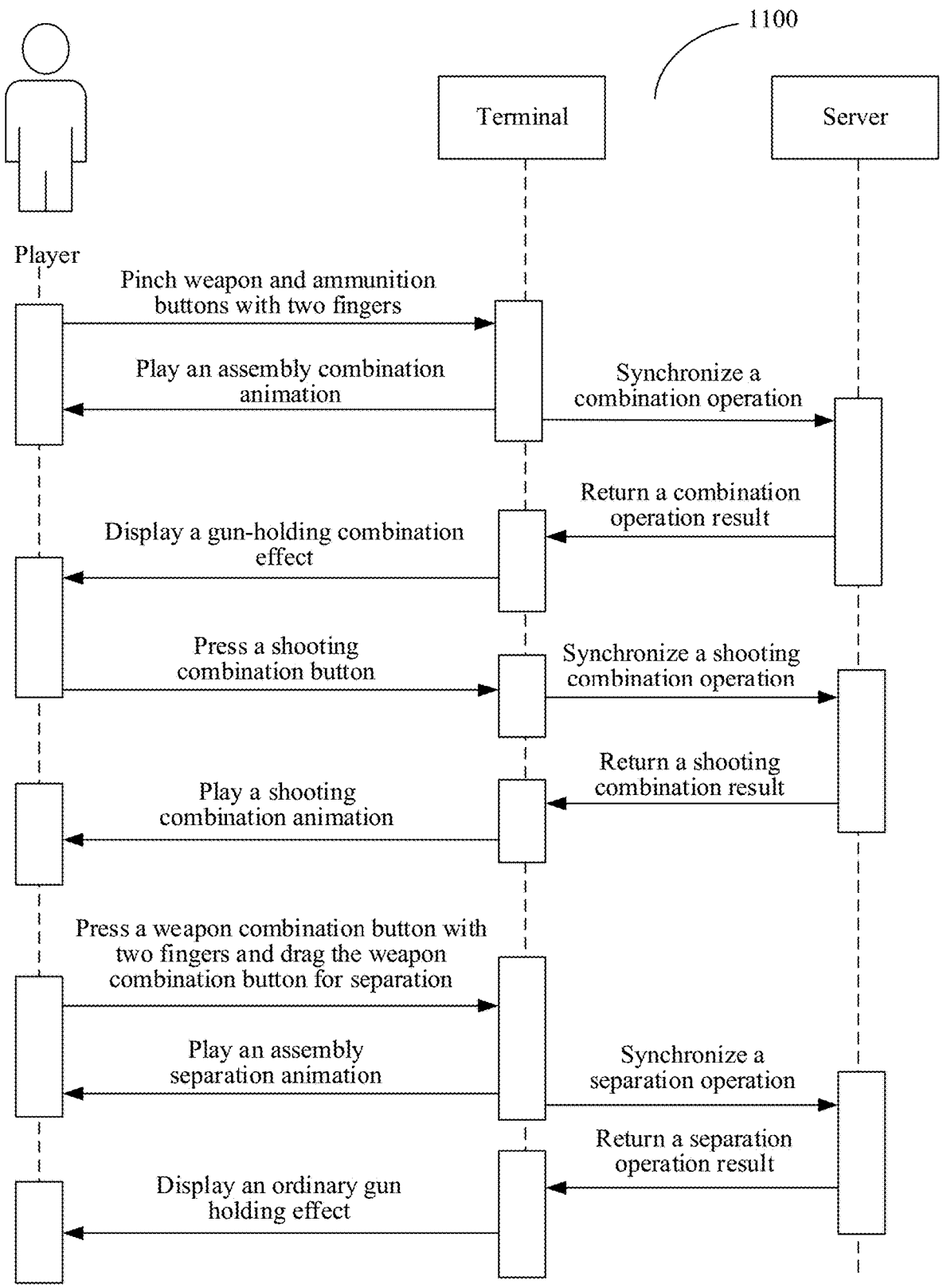
FIG. 11 is a schematic principle diagram of a method for displaying a virtual item according to an embodiment of this disclosure.

FIG. 11 is a schematic principle diagram of a method for displaying a virtual item according to an embodiment of this disclosure. As shown in 1100, an example in which two virtual weapons are combined into a combined weapon in an FPS game is used. This embodiment includes the following steps.

Step 1. A user pinches weapon and ammunition buttons with two fingers.

Step 2. A terminal plays an item combination animation.

Step 3. The terminal synchronizes an item combination operation with a server.

Step 4. The server returns a combination operation result to the terminal.

Step 5. The terminal displays a gun-holding combination effect.

Step 6. The user presses a shooting combination button.

Step 7. The terminal synchronizes a shooting combination operation to the server.

Step 8. The server returns a shooting combination result to the terminal.

Step 9. The terminal plays a shooting combination animation.

Step 10. The user presses a weapon combination button with two fingers and drags the weapon combination button for separation.

Step 11. The terminal plays an item separation animation.

Step 12. The terminal synchronizes an item separation operation with the server.

Step 13. The server returns a separation operation result to the terminal.

Step 14. The terminal displays an ordinary gun holding effect.

In this embodiment of this disclosure, in a game battle, the user can quickly realize the combination and separation of weapons in the game through a pinch operation and a release operation with the two fingers. In addition, an animation in which a character completes weapon combination and weapon separation can be displayed in real time in the game battle, which can meet the needs of real-time weapon combination and weapon separation in the game battle. Moreover, through the pinch operation and the release operation performed by the two fingers, a combination instruction and a separation instruction can be conveniently and quickly issued. Such an operation manner has low operation difficulty, low complexity, and is humanized, thereby greatly improving the user experience.

Figure 12:
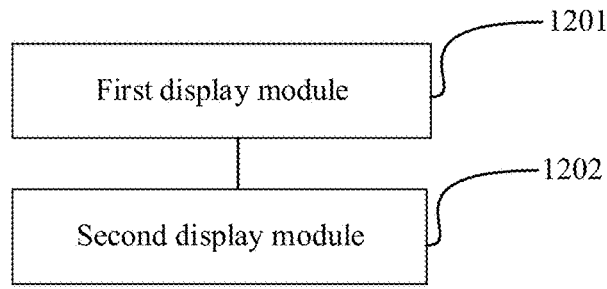
FIG. 12 is a schematic structural diagram of an apparatus for displaying a virtual item according to an embodiment of this disclosure.

FIG. 12 is a schematic structural diagram of an apparatus for displaying a virtual item according to an embodiment of this disclosure. In this disclosure, a unit and a module may be hardware such as a combination of electronic circuitries; firmware; or software such as computer instructions. The unit and the module may also be any combination of hardware, firmware, and software. In some implementation, a unit may include at least one module. Referring to FIG. 12, the apparatus includes:

a first display module 1201, configured to display a target virtual object in a virtual scene, the target virtual object having a plurality of virtual items, and the plurality of virtual items respectively having virtual functions; and a second display module 1202, configured to display a target virtual item in the virtual scene in response to a first trigger operation on at least two virtual items of the plurality of virtual items, the target virtual item being obtained by combining the at least two virtual items, and the target virtual item having a new virtual function different from the virtual functions of the at least two virtual items.

In the apparatus provided in the embodiments of this disclosure, an interaction manner in which at least two virtual items are combined into a new target virtual item is provided, so that in a case that the target virtual item is equipped by the user, a new virtual function of the target virtual item can be realized without frequently switching the virtual items in a game, thereby greatly reducing the operation difficulty of the user, enriching a manner of controlling a virtual item, and improving the efficiency of human-computer interaction.

In a possible implementation, based on the apparatus composition of FIG. 12, the second display module 1202 includes:

an obtaining unit, configured to obtain the target virtual item in response to the first trigger operation; and an assembly control unit, configured to display, in the virtual scene, that the target virtual object is equipped with the target virtual item.

In a possible implementation, based on the apparatus composition of FIG. 12, the obtaining unit includes:

an obtaining subunit, configured to combine the at least two virtual items in response to the first trigger operation, to obtain the target virtual item.

In a possible implementation, based on the apparatus composition of FIG. 12, the apparatus further includes:

transmitting a combination instruction for the at least two virtual items to a server;

and the assembly control unit is configured to:

display, based on confirmation information of the server for the combination instruction, that the target virtual object is equipped with the target virtual item.

In a possible implementation, the first display module is further configured to:

display display controls of the plurality of virtual items owned by the target virtual object; and the second display module is configured to:

display the target virtual item in the virtual scene in response to a pinch operation on the display controls of the at least two virtual items.

In a possible implementation, the second display module is configured to:

transmit operation information of the first trigger operation to a server in response to the first trigger operation, the operation information indicating to combine the at least two virtual items; and obtain the target virtual item issued by the server based on the operation information, and display the target virtual item in the virtual scene.

In a possible implementation, the second display module is configured to:

play an item combination animation in response to the first trigger operation, the item combination animation being an animation in which the target virtual object combines the at least two virtual items into the target virtual item.

In a possible implementation, the first display module 1201 is further configured to: display a first launch function option of the target virtual item in the virtual scene; and based on the apparatus composition of FIG. 12, the apparatus further includes:

a launch control module, configured to control, in response to a trigger operation on the first launch function option, the target virtual object to simultaneously launch projectiles of the at least two virtual items based on the target virtual item.

In a possible implementation, the first display module 1201 is further configured to: display a second launch function option and a throwing function option of the target virtual item in the virtual scene; and based on the apparatus composition of FIG. 12, the apparatus further includes:

a launch control module, configured to control, in response to a trigger operation on the second launch function option, the target virtual object to launch a projectile of the shooting item of the at least two virtual items based on the target virtual item; and a throwing control unit, configured to control, in response to a trigger operation on the throwing function option, the target virtual object to throw the throwing items of the at least two virtual items based on the target virtual item.

In a possible implementation, the first display module 1201 is further configured to: display a third launch function option and a confrontation function option of the target virtual item in the virtual scene; and based on the apparatus composition of FIG. 12, the apparatus further includes:

a launch control module, configured to control, in response to a trigger operation on the third launch function option, the target virtual object to launch a projectile of the shooting item of the at least two virtual items based on the target virtual item; and a confrontation control unit, configured to control, in response to a trigger operation on the confrontation function option, the target virtual object to compete based on the cold weapon item of the at least two virtual items.

In a possible implementation, the first display module 1201 is further configured to: display a fourth launch function option and a fifth launch function option of the target virtual item in the virtual scene; and based on the apparatus composition of FIG. 12, the apparatus further includes:

a launch control module, configured to control, in response to a trigger operation on the fourth launch function option, the target virtual object to launch a projectile of the shooting item of the at least two virtual items based on the target virtual item; and the launch control module, being further configured to control, in response to a trigger operation on the fifth launch function option, the target virtual object to launch a target projectile based on the target virtual item.

In a possible implementation, based on the apparatus composition of FIG. 12, the apparatus further includes:

an obtaining module, configured to separate the target virtual item in response to a second trigger operation on the target virtual item, to obtain the at least two virtual items.

In a possible implementation, based on the apparatus composition of FIG. 12, the apparatus further includes:

a transmission module, configured to transmit a separation instruction for the target virtual item to a server; and the second display module, being further configured to display, based on confirmation information of the server for the separation instruction, that the target virtual object is equipped with any shooting item of the at least two virtual items.

In a possible implementation, the apparatus further includes:

a separation module, configured to play an item separation animation in response to a second trigger operation on the target virtual item, the item separation animation being an animation in which the target virtual object separates the target virtual item into the at least two virtual items.

Any combination of all the foregoing optional technical solutions may be used to form an optional embodiment of the present disclosure, and details are not described herein again.

In a possible implementation, the plurality of virtual items respectively have interaction functions, the interaction function being a function for the target virtual object to interact with another virtual object in the virtual scene based on the virtual item; and the target virtual item has a new interaction function different from the interaction functions of the at least two virtual items.

The division of the above functional modules is only described for exemplary purposes when the apparatus for displaying a virtual item provided in the foregoing embodiment displays a virtual item. In actual application, the functions can be allocated to different functional modules based on specific needs, which means that the internal structure of the electronic device is divided into different functional modules to complete all or some of the above described functions. In addition, the apparatus for displaying a virtual item provided in the foregoing embodiment belongs to the same concept as the method for displaying a virtual item embodiment. For a specific implementation process of the apparatus, refer to the method embodiments for displaying a virtual item. Details are not described herein again.

Figure 13:
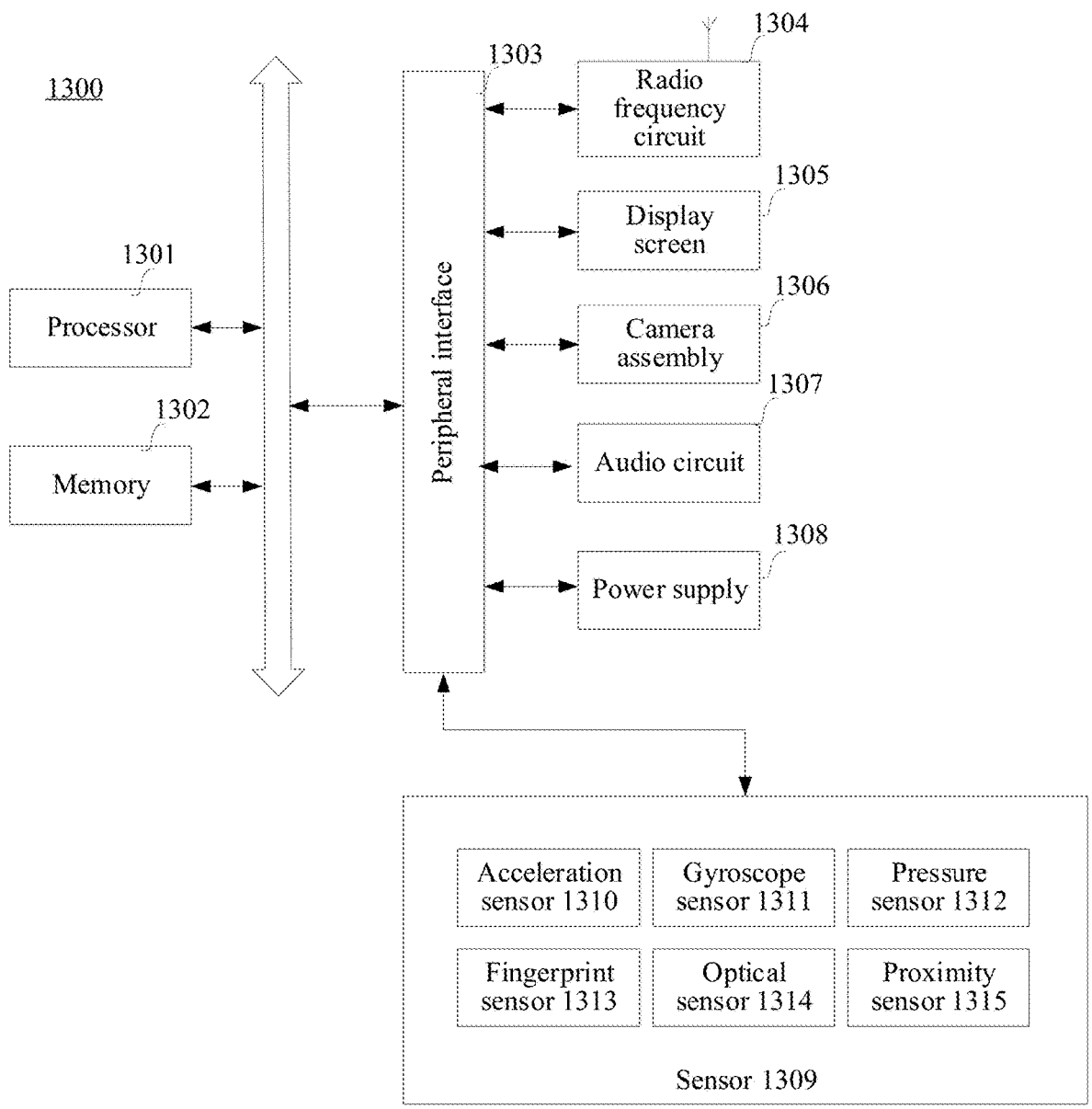
FIG. 13 is a schematic structural diagram of a terminal according to an embodiment of this disclosure.

FIG. 13 is a schematic structural diagram of a terminal according to an embodiment of this disclosure. The terminal is an exemplary illustration of an electronic device. Generally, a terminal 1300 includes a processor 1301 and a memory 1302.

Optionally, the processor 1301 includes one or more processing cores, for example, a 4-core processor or an 8-core processor. Optionally, the processor 1301 may be implemented in at least one hardware form of a digital signal processor (DSP), a field-programmable gate array (FPGA), and a programmable logic array (PLA). In some embodiments, the processor 1301 is integrated with a graphics processing unit (GPU). The GPU is configured to render and draw content that needs to be displayed on a display.

In some embodiments, the memory 1302 includes one or more non-transitory computer-readable storage media. In some embodiments, a non-transitory computer-readable storage medium in the memory 1302 is configured to store at least one program code, and the at least one program code is configured to be executed by the processor 1301 to implement the method for displaying a virtual item provided in the embodiments of this disclosure.

In some embodiments, the terminal 1300 may optionally further include: a peripheral interface 1303 and at least one peripheral. The processor 1301, the memory 1302, and the peripheral interface 1303 may be connected through a bus or a signal cable. Each peripheral may be connected to the peripheral interface 1303 through the bus, the signal line, or a circuit board. Specifically, the peripheral includes: at least one of a radio frequency (RF) circuit 1304, a touch display screen 1305, a camera assembly 1306, an audio circuit 1307, or a power supply 1309.

The peripheral interface 1303 may be configured to connect at least one peripheral related to input/output (I/O) to the processor 1301 and the memory 1302. In some embodiments, the processor 1301, the memory 1302, and the peripheral interface 1303 are integrated on the same chip or the same circuit board. In some other embodiments, any or both of the processor 1301, the memory 1302, and the peripheral interface 1303 are implemented on an independent chip or circuit board, which is not limited in this embodiment.

The RF circuit 1304 is configured to receive and transmit an RF signal, which is also referred to as an electromagnetic signal. The RF circuit 1304 communicates with a communication network and another communications device by using the electromagnetic signal. The RF circuit 1304 converts an electrical signal into an electromagnetic signal for transmission, or converts a received electromagnetic signal into an electrical signal. Optionally, the RF circuit 1304 includes: an antenna system, an RF transceiver, one or more amplifiers, a tuner, an oscillator, a digital signal processor, a codec chip set, a subscriber identity module card, and the like. Optionally, the RF circuit 1304 may communicate with other terminals through at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the RF circuit 1304 further includes a circuit related to near field communication (NFC), which is not limited in this application.

The display screen 1305 is configured to display a UI. Optionally, the UI may include a graph, a text, an icon, a video, and any combination thereof. When the display screen 1305 is a touchscreen, the display screen 1305 is further capable of acquiring a touch signal on or above a surface of the display screen 1305. The touch signal may be inputted to the processor 1301 for processing as a control signal. Optionally, the display screen 1305 is further configured to provide a virtual button and/or a virtual keyboard, which is also referred to as a soft button and/or a soft keyboard. In some embodiments, there is one display screen 1305 disposed on a front panel of the terminal 1300. In some other embodiments, there are at least two display screens 1305 that are respectively disposed on different surfaces of the terminal 1300 or folded. In still other embodiments, the display screen 1305 is a flexible display screen disposed on a curved surface or a folded surface of the terminal 1300. Optionally, the display screen 1305 is even set in a non-rectangular irregular pattern, namely, a special-shaped screen. Optionally, the display screen 1305 is manufactured by using a material such as a liquid crystal display (LCD) or an organic light-emitting diode (OLED).

The camera assembly 1306 is configured to capture an image or a video. Optionally, the camera assembly 1306 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera component 1306 further includes a flash. Optionally, the flash is a single color temperature flash or a double color temperature flash. The double color temperature flash is a combination of a warm light flash and a cold light flash, and is used for light compensation under different color temperatures.

In some embodiments, the audio circuit 1307 includes a microphone and a speaker. The speaker is configured to acquire sound waves of a user and an environment, and convert the sound waves into electric signals and input the electrical signals into the processor 1301 for processing, or input the electrical signals into the RF circuit 1304 to implement speech communication. For the purpose of stereo acquisition or noise reduction, there are a plurality of microphones, disposed at different parts of the terminal 1300 respectively. Optionally, the microphone is an array microphone or an omni-directional acquisition microphone. The speaker is configured to convert electric signals from the processor 1301 or the RF circuit 1304 into sound waves. Optionally, the speaker is a conventional thin-film speaker or a piezoelectric ceramic speaker. When the speaker is the piezoelectric ceramic speaker, electrical signals not only can be converted into sound waves that can be heard by human, but also can be converted into sound waves that cannot be heard by human for ranging or other uses. In some embodiments, the audio circuit 1307 further includes an earphone jack.

A power supply 1308 is configured to supply power to assemblies in the terminal 1300. Optionally, the power supply 1308 is an alternating current, a direct current, a disposable battery, or a rechargeable battery. When the power supply 1308 includes a rechargeable battery, the rechargeable battery is a wired rechargeable battery or a wireless rechargeable battery. The rechargeable battery is further configured to support a fast charge technology.

In some embodiments, the terminal 1300 also includes one or more sensors 1309. The one or more sensors 1309 include, but are not limited to, an acceleration sensor 1310, a gyroscope sensor 1311, a pressure sensor 1312, a fingerprint sensor 1313, an optical sensor 1314, and a proximity sensor 1315.

In some embodiments, the acceleration sensor 1310 detects accelerations on three coordinate axes of a coordinate system established by the terminal 1300. For example, the acceleration sensor 1310 is configured to detect components of the gravity acceleration on the three coordinate axes. Optionally, the processor 1301 controls, according to a gravity acceleration signal collected by the acceleration sensor 1310, the display screen 1305 to display the UI in a landscape view or a portrait view. The acceleration sensor 1310 is further configured to acquire motion data of a game or a user.

In some embodiments, the gyroscope sensor 1311 detects a body direction and a rotation angle of the terminal 1300. The gyroscope sensor 1311 acquires a 3D action of the user on the terminal 1300 together with the acceleration sensor 1310. The processor 1301 implements the following functions according to data acquired by the gyroscope sensor 1311: motion sensing (for example, the UI is changed according to a tilt operation of a user), image stabilization during shooting, game control, and inertial navigation.

Optionally, the pressure sensor 1312 is disposed at a side frame of the terminal 1300 and/or a lower layer of the display screen 1305. When the pressure sensor 1312 is disposed on the side frame of the terminal 1300, a holding signal of the user to the terminal 1300 can be detected, and left/right hand identification or a quick action may be performed by the processor 1301 according to the holding signal acquired by the pressure sensor 1312. When the pressure sensor 1312 is disposed on the low layer of the display screen 1305, the processor 1301 controls, according to a pressure operation of the user on the display screen 1305, an operable control on the UI. The operable control includes at least one of a button control, a scroll-bar control, an icon control, or a menu control.

The fingerprint sensor 1313 is configured to acquire a fingerprint of a user, and the processor 1301 recognizes an identity of the user according to the fingerprint acquired by the fingerprint sensor 1313, or the fingerprint sensor 1313 recognizes the identity of the user based on the acquired fingerprint. When identifying that the identity of the user is a trusted identity, the processor 1301 authorizes the user to perform related sensitive operations. The sensitive operations include: unlocking a screen, viewing encrypted information, downloading software, paying, changing a setting, and the like. Optionally, the fingerprint sensor 1313 is disposed on a front face, a back face, or a side face of the terminal 1300. When a physical button or a vendor logo is disposed on the terminal 1300, the fingerprint sensor 1313 may be integrated together with the physical button or the vendor logo.

The optical sensor 1314 is configured to acquire ambient light intensity. In an embodiment, the processor 1301 controls display brightness of the display screen 1305 according to the ambient light intensity acquired by the optical sensor 1314. Specifically, when the ambient light intensity is relatively high, the display brightness of the display screen 1305 is turned up. In a case that the ambient light intensity is relatively low, the display brightness of the display screen 1305 is reduced. In another embodiment, the processor 1301 further dynamically adjusts a camera parameter of the camera component 1306 according to the ambient light intensity acquired by the optical sensor 1314.

The proximity sensor 1315 is also referred to as a distance sensor and is generally disposed at the front panel of the terminal 1300. The proximity sensor 1315 is configured to acquire a distance between the user and the front surface of the terminal 1300. In an embodiment, when the proximity sensor 1315 detects that the distance between the user and the front surface of the terminal 1300 gradually becomes small, the display screen 1305 is controlled by the processor 1301 to switch from a screen-on state to a screen-off state. When the proximity sensor 1315 detects that the distance between the user and the front surface of the terminal 1300 gradually increases, the display screen 1305 is controlled by the processor 1301 to switch from the screen-off state to the screen-on state.

A person skilled in the art can understand that the structure shown in FIG. 13 does not constitute a limitation to the terminal 1300, and the terminal can include more or fewer components than those shown in the figure, or some components may be combined, or a different component arrangement may be used.

Figure 14:
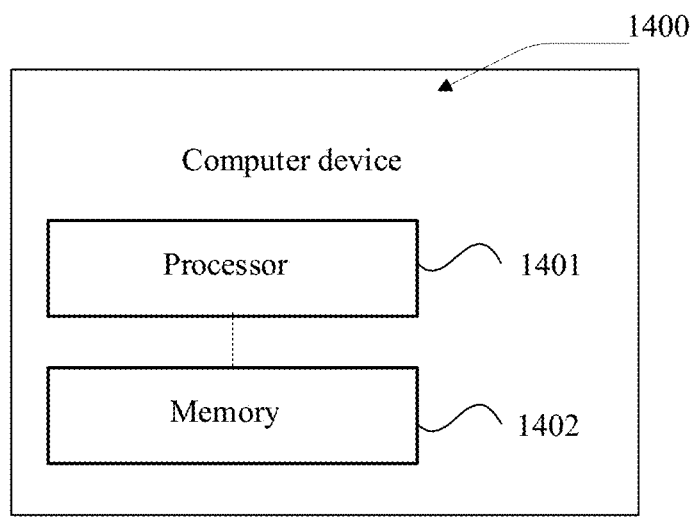
FIG. 14 is a schematic structural diagram of an electronic device according to an embodiment of this disclosure.

FIG. 14 is a schematic structural diagram of an electronic device according to an embodiment of this disclosure. The electronic device 1400 may vary a lot due to different configurations or performance. The electronic device 1400 includes one or more central processing units (CPUs) 1401 and one or more memories 1402. The memory 1402 stores at least one computer program, the at least one computer program being loaded and executed by one or more processors 1401 to implement the method for displaying a virtual item provided in the foregoing method embodiments. Optionally, the electronic device 1400 further includes components such as a wired or wireless network interface, a keyboard, and an I/O interface, to facilitate input and output. The electronic device 1400 further includes another component configured to implement a function of a device. Details are not further described herein.

An embodiment of this disclosure further provides an electronic device, including one or more processors and one or more memories, the one or more memories storing at least one computer program, the at least one computer program being loaded and executed by the processor to implement the following steps:

displaying a target virtual object in a virtual scene, the target virtual object having a plurality of virtual items, and the plurality of virtual items respectively having virtual functions; and displaying a target virtual item in the virtual scene in response to a first trigger operation on at least two virtual items of the plurality of virtual items, the target virtual item being obtained by combining the at least two virtual items, and the target virtual item having a new virtual function different from the virtual functions of the at least two virtual items.

Optionally, the at least one program code is loaded and executed by the processor to implement the following steps:

obtaining the target virtual item in response to the first trigger operation; and displaying, in the virtual scene, that the target virtual object is equipped with the target virtual item.

Optionally, the at least one program code is loaded and executed by the processor to implement the following step:

combining the at least two virtual items in response to the first trigger operation, to obtain the target virtual item.

Optionally, the at least one program code is loaded and executed by the processor to implement the following step:

transmitting a combination instruction for the at least two virtual items to a server; and the displaying, in the virtual scene, that the target virtual object is equipped with the target virtual item includes:

displaying, based on confirmation information of the server for the combination instruction, that the target virtual object is equipped with the target virtual item.

Optionally, the at least one program code is loaded and executed by the processor to implement the following steps:

displaying display controls of the plurality of virtual items owned by the target virtual object; and the displaying a target virtual item in the virtual scene in response to a first trigger operation on at least two virtual items of the plurality of virtual items includes:

displaying the target virtual item in the virtual scene in response to a pinch operation on the display controls of the at least two virtual items.

Optionally, the at least one program code is loaded and executed by the processor to implement the following steps:

transmitting operation information of the first trigger operation to the server in response to the first trigger operation, the operation information indicating to combine the at least two virtual items; and obtaining the target virtual item issued by the server based on the operation information, and displaying the target virtual item in the virtual scene.

Optionally, the at least one program code is loaded and executed by the processor to implement the following step:

playing an item combination animation in response to the first trigger operation, the item combination animation being an animation in which the target virtual object combines the at least two virtual items into the target virtual item.

Optionally, the at least one program code is loaded and executed by the processor to implement the following steps:

displaying a first launch function option of the target virtual item in the virtual scene; and controlling, in response to a trigger operation on the first launch function option, the target virtual object to simultaneously launch projectiles of the at least two virtual items based on the target virtual item.

Optionally, the at least one program code is loaded and executed by the processor to implement the following steps:

displaying a second launch function option and a throwing function option of the target virtual item in the virtual scene; and controlling, in response to a trigger operation on the second launch function option, the target virtual object to launch a projectile of the shooting item of the at least two virtual items based on the target virtual item; and controlling, in response to a trigger operation on the throwing function option, the target virtual object to throw the throwing item of the at least two virtual items based on the target virtual item.

Optionally, the at least one program code is loaded and executed by the processor to implement the following steps:

displaying a third launch function option and a confrontation function option of the target virtual item in the virtual scene; and controlling, in response to a trigger operation on the third launch function option, the target virtual object to launch a projectile of the shooting item of the at least two virtual items based on the target virtual item; and controlling, in response to a trigger operation on the confrontation function option, the target virtual object to compete based on the cold weapon item of the at least two virtual items.

Optionally, the at least one program code is loaded and executed by the processor to implement the following steps:

displaying a fourth launch function option and a fifth launch function option of the target virtual item in the virtual scene; and controlling, in response to a trigger operation on the fourth launch function option, the target virtual object to launch a projectile of the shooting item of the at least two virtual items based on the target virtual item; and controlling, in response to a trigger operation on the fifth launch function option, the target virtual object to launch the target projectile based on the target virtual item.

Optionally, the at least one program code is loaded and executed by the processor to implement the following step:

separating the target virtual item in response to a second trigger operation on the target virtual item, to obtain the at least two virtual items.

Optionally, the at least one program code is loaded and executed by the processor to implement the following steps:

transmitting a separation instruction for the target virtual item to the server; and displaying, based on confirmation information of the server for the separation instruction, that the target virtual object is equipped with any shooting item of the at least two virtual items.

Optionally, the at least one program code is loaded and executed by the processor to implement the following step:

playing an item separation animation in response to the second trigger operation on the target virtual item, the item separation animation being an animation in which the target virtual object separates the target virtual item into the at least two virtual items.

Optionally, the plurality of virtual items respectively have interaction functions, the interaction function being a function for the target virtual object to interact with another virtual object in the virtual scene based on the virtual item; and the target virtual item has a new interaction function different from the interaction functions of the at least two virtual items.

In an exemplary embodiment, a non-transitory computer-readable storage medium, for example, a memory including at least one computer program is further provided. The at least one computer program may be executed by a processor in a terminal to implement the following steps:

displaying a target virtual object in a virtual scene, the target virtual object having a plurality of virtual items, and the plurality of virtual items respectively having virtual functions; and displaying a target virtual item in the virtual scene in response to a first trigger operation on at least two virtual items of the plurality of virtual items, the target virtual item being obtained by combining the at least two virtual items, and the target virtual item having a new virtual function different from the virtual functions of the at least two virtual items.

For example, the non-transitory computer-readable storage medium includes a read-only memory (ROM), a random access memory (RAM), a compact disc read-only memory (CD-ROM), a magnetic tape, a floppy disk, an optical data storage device, or the like.

Optionally, the at least one program code may be loaded and executed by a processor of an electronic device to implement the following steps:

obtaining the target virtual item in response to the first trigger operation; and displaying, in the virtual scene, that the target virtual object is equipped with the target virtual item.

Optionally, the at least one program code may be loaded and executed by a processor of an electronic device to implement the following step: combining the at least two virtual items in response to the first trigger operation, to obtain the target virtual item.

Optionally, the at least one program code may be loaded and executed by a processor of an electronic device to implement the following steps: transmitting a combination instruction for the at least two virtual items to a server; and the displaying, in the virtual scene, that the target virtual object is equipped with the target virtual item includes:

displaying, based on confirmation information of the server for the combination instruction, that the target virtual object is equipped with the target virtual item.

Optionally, the at least one program code may be loaded and executed by a processor of an electronic device to implement the following steps:

displaying display controls of the plurality of virtual items owned by the target virtual object; and the displaying a target virtual item in the virtual scene in response to a first trigger operation on at least two virtual items of the plurality of virtual items includes:

displaying the target virtual item in the virtual scene in response to a pinch operation on the display controls of the at least two virtual items.

Optionally, the at least one program code may be loaded and executed by a processor of an electronic device to implement the following steps:

transmitting operation information of the first trigger operation to the server in response to the first trigger operation, the operation information indicating to combine the at least two virtual items; and obtaining the target virtual item issued by the server based on the operation information, and displaying the target virtual item in the virtual scene.

Optionally, the at least one program code may be loaded and executed by a processor of an electronic device to implement the following step:

playing an item combination animation in response to the first trigger operation, the item combination animation being an animation in which the target virtual object combines the at least two virtual items into the target virtual item.

Optionally, the at least one program code may be loaded and executed by a processor of an electronic device to implement the following steps:

displaying a first launch function option of the target virtual item in the virtual scene;
and controlling, in response to a trigger operation on the first launch function option, the target virtual object to simultaneously launch projectiles of the at least two virtual items based on the target virtual item.

Optionally, the at least one program code may be loaded and executed by a processor of an electronic device to implement the following steps:

displaying a second launch function option and a throwing function option of the target virtual item in the virtual scene; and controlling, in response to a trigger operation on the second launch function option, the target virtual object to launch a projectile of the shooting item of the at least two virtual items based on the target virtual item; and controlling, in response to a trigger operation on the throwing function option, the target virtual object to throw the throwing item of the at least two virtual items based on the target virtual item.

Optionally, the at least one program code may be loaded and executed by a processor of an electronic device to implement the following steps:

displaying a third launch function option and a confrontation function option of the target virtual item in the virtual scene; and controlling, in response to a trigger operation on the third launch function option, the target virtual object to launch a projectile of the shooting item of the at least two virtual items based on the target virtual item; and controlling, in response to a trigger operation on the confrontation function option, the target virtual object to compete based on the cold weapon item of the at least two virtual items.

Optionally, the at least one program code may be loaded and executed by a processor of an electronic device to implement the following steps:

displaying a fourth launch function option and a fifth launch function option of the target virtual item in the virtual scene; and controlling, in response to a trigger operation on the fourth launch function option, the target virtual object to launch a projectile of the shooting item of the at least two virtual items based on the target virtual item; and controlling, in response to a trigger operation on the fifth launch function option, the target virtual object to launch the target projectile based on the target virtual item.

Optionally, the at least one program code may be loaded and executed by a processor of an electronic device to implement the following step:

separating the target virtual item in response to a second trigger operation on the target virtual item, to obtain the at least two virtual items.

Optionally, the at least one program code may be loaded and executed by a processor of an electronic device to implement the following steps:

transmitting a separation instruction for the target virtual item to the server; and displaying, based on confirmation information of the server for the separation instruction, that the target virtual object is equipped with any shooting item of the at least two virtual items.

Optionally, the at least one program code may be loaded and executed by a processor of an electronic device to implement the following step:

playing an item separation animation in response to the second trigger operation on the target virtual item, the item separation animation being an animation in which the target virtual object separates the target virtual item into the at least two virtual items.

Optionally, the plurality of virtual items respectively have interaction functions, the interaction function being a function for the target virtual object to interact with another virtual object in the virtual scene based on the virtual item; and the target virtual item has a new interaction function different from the interaction functions of the at least two virtual items.

In an exemplary embodiment, a computer program product or a computer program is further provided, including one or more pieces of program code, the one or more pieces of program code being stored in a non-transitory computer-readable storage medium. One or more processors of an electronic device can read the one or more pieces of program code from the non-transitory computer-readable storage medium, and the one or more processors execute the one or more pieces of program code to enable the electronic device to perform the method for displaying a virtual item in the foregoing embodiments.

A person of ordinary skill in the art may understand that all or some of the steps of the foregoing embodiments may be implemented by hardware or may be implemented by a program instructing relevant hardware. Optionally, the program is stored in a non-transitory computer-readable storage medium. Optionally, the non-transitory storage medium mentioned above is a ROM, a magnetic disk, an optical disc, or the like.

The foregoing descriptions are merely optional embodiments of this disclosure, but are not intended to limit this application. Any modification, equivalent replacement, or improvement made within the spirit and principle of this application shall fall within the protection scope of this application.

What is claimed is:

1. A method for displaying a virtual item, performed by an electronic device, the method comprising:

displaying a virtual object in a virtual scene, the virtual object having a plurality of virtual items, the plurality of virtual items being equipped by or individually accessible to the virtual object and respectively having virtual functions; and displaying a virtual assembled item in the virtual scene in response to a first trigger operation targeting at least two virtual items of the plurality of virtual items, the virtual assembled item being obtained by combining the at least two virtual items into a target virtual item, the target virtual item supporting a new virtual function, the new virtual function of the target virtual item being different from the virtual function of each of the at least two virtual items alone, and the new virtual function of the target virtual item being realized without switching the target virtual item by the virtual object.

2. The method according to claim 1, wherein displaying the virtual assembled item in the virtual scene in response to the first trigger operation targeting the at least two virtual items of the plurality of virtual items comprises:

obtaining the virtual assembled item in response to the first trigger operation; and displaying, in the virtual scene, the virtual object as being equipped with the virtual assembled item.

3. The method according to claim 2, wherein obtaining the virtual assembled item in response to the first trigger operation comprises:

combining the at least two virtual items in response to the first trigger operation, to obtain the virtual assembled item.

4. The method according to claim 2, wherein:

after obtaining the virtual assembled item in response to the first trigger operation, the method further comprises:

transmitting a combination instruction for the at least two virtual items to a server; and displaying, in the virtual scene, that the virtual object is equipped with the virtual assembled item comprises:

receiving, from the server, a confirmation to the combination instruction; and in response to the confirmation, displaying, in the virtual scene, that the virtual object is equipped with the virtual assembled item.

5. The method of claim 1, wherein the first trigger operation comprises a drag operation on the at least two virtual items of the plurality of virtual items making the at least two virtual items being in contact with each other.

6. The method according to claim 1, further comprising:
showing display controls of the plurality of virtual items owned by the virtual object; and
displaying the virtual assembled item in the virtual scene in response to the first trigger operation targeting the at least two virtual items of the plurality of virtual items comprises:
displaying the virtual assembled item in the virtual scene in response to a pinch operation on the display controls of the at least two virtual items.

7. The method according to claim 1, wherein displaying the virtual assembled item in the virtual scene in response to the first trigger operation targeting the at least two virtual items of the plurality of virtual items comprises:
transmitting operation information of the first trigger operation to a server in response to the first trigger operation, the operation information indicating to combine the at least two virtual items; and
obtaining the virtual assembled item issued by the server based on the operation information, and displaying the virtual assembled item in the virtual scene.

8. The method according to claim 1, wherein displaying the virtual assembled item in the virtual scene in response to the first trigger operation targeting the at least two virtual items of the plurality of virtual items comprises:
playing an item combination animation in response to the first trigger operation, the item combination animation being an animation in which the virtual object combines the at least two virtual items into the virtual assembled item.

9. The method according to claim 1, wherein the at least two virtual items are shooting items, and after displaying the virtual assembled item in the virtual scene in response to the first trigger operation targeting the at least two virtual items of the plurality of virtual items, the method further comprises:
displaying a first launch function control of the virtual assembled item in the virtual scene; and
in response to a trigger operation on the first launch function control, controlling the virtual object to simultaneously launch projectiles of the at least two virtual items which are assembled in the virtual assembled item.

10. The method according to claim 1, wherein the at least two virtual items comprise a shooting item and a throwing item, and after displaying the virtual assembled item in the virtual scene in response to the first trigger operation targeting the at least two virtual items of the plurality of virtual items, the method further comprises:
displaying a second launch function control and a throwing function control of the virtual assembled item in the virtual scene;
in response to a trigger operation on the second launch function control, controlling the virtual object to launch a projectile of the shooting item; and
in response to a trigger operation on the throwing function control, controlling the virtual object to throw the throwing item.

11. The method according to claim 1, wherein the at least two virtual items comprise a shooting item and a cold weapon item, and after displaying the virtual assembled item in the virtual scene in response to the first trigger operation targeting the at least two virtual items of the plurality of virtual items, the method further comprises:
displaying a third launch function control and a confrontation function control of the virtual assembled item in the virtual scene;
in response to a trigger operation on the third launch function control, controlling the virtual object to launch a projectile of the shooting item; and
in response to a trigger operation on the confrontation function control, controlling the virtual object to fight using the cold weapon item.

12. The method according to claim 1, wherein the at least two virtual items comprise a shooting item and a special ammunition, and after displaying the virtual assembled item in the virtual scene in response to the first trigger operation targeting the at least two virtual items of the plurality of virtual items, the method further comprises:
displaying a fourth launch function control and a fifth launch function control of the virtual assembled item in the virtual scene;
in response to a trigger operation on the fourth launch function control, controlling the virtual object to launch a projectile of the shooting item; and
in response to a trigger operation on the fifth launch function control, controlling the virtual object to launch the special ammunition by using the shooting item.

13. The method according to claim 1, wherein after displaying the virtual assembled item in the virtual scene in response to the first trigger operation targeting the at least two virtual items of the plurality of virtual items, the method further comprises:
separating the virtual assembled item in response to a second trigger operation on the virtual assembled item, to obtain the at least two virtual items.

14. The method according to claim 13, wherein after separating the virtual assembled item, the method further comprises:
transmitting a separation instruction for the virtual assembled item to a server;
receiving, from the server, a confirmation to the separation instruction; and
displaying, based on the confirmation, that the virtual object is equipped with the at least two virtual items.

15. The method according to claim 1, wherein after the displaying the virtual assembled item in the virtual scene in response to the first trigger operation targeting the at least two virtual items of the plurality of virtual items, the method further comprises:
playing an item separation animation in response to a second trigger operation on the virtual assembled item, the item separation animation being an animation in which the virtual object separates the virtual assembled item into the at least two virtual items.

16. The method according to claim 1, wherein each of the plurality of virtual items has a corresponding interaction function, the corresponding interaction function being utilized by the virtual object to interact with another virtual object in the virtual scene; and the virtual assembled item has a new interaction function different from interaction functions of the at least two virtual items.

17. A device comprising a memory for storing computer instructions and a processor in communication with the memory, wherein, when the processor executes the computer instructions, the processor is configured to cause the device to:
display a virtual object in a virtual scene, the virtual object having a plurality of virtual items, the plurality of virtual items being equipped by or individually accessible to the virtual object and respectively having virtual functions; and display a virtual assembled item in the virtual scene in response to a first trigger operation targeting at least two virtual items of the plurality of virtual items, the virtual assembled item being obtained by combining the at least two virtual items into a target virtual item, the target virtual item supporting a new virtual function, the new virtual function of the target virtual item being different from the virtual function of each of the at least two virtual items alone, and the new virtual function of the target virtual item being realized without switching the target virtual items by the virtual object.

18. The device according to claim 17, wherein, when the processor is configured to cause the device to display the virtual assembled item in the virtual scene in response to the first trigger operation targeting at least two virtual items of the plurality of virtual items, the processor is configured to cause the device to:

obtain the virtual assembled item in response to the first trigger operation; and display, in the virtual scene, the virtual object as equipped with the virtual assembled item.

19. The device according to claim 18, wherein:

after the processor is configured to cause the device to obtain the virtual assembled item in response to the first trigger operation, the processor is configured to further cause the device to:

transmit a combination instruction for the at least two virtual items to a server; and when the processor is configured to cause the device to display, in the virtual scene, that the virtual object is equipped with the virtual assembled item, the processor is configured to cause the device to:

receive, from the server, a confirmation to the combination instruction; and in response to the confirmation, display, in the virtual scene, that the virtual object is equipped with the virtual assembled item.

20. The device according to claim 17, wherein:

when the processor executes the computer instructions, the processor is configured to further cause the device to:

show display controls of the plurality of virtual items owned by the virtual object; and when the processor is configured to cause the device to display the virtual assembled item in the virtual scene in response to the first trigger operation targeting at least two virtual items of the plurality of virtual items, the processor is configured to cause the device to:

display the virtual assembled item in the virtual scene in response to a pinch operation on the display controls of the at least two virtual items.

21. A non-transitory storage medium for storing computer readable instructions, the computer readable instructions, when executed by a processor, causing the processor to:

display a virtual object in a virtual scene, the virtual object having a plurality of virtual items, the plurality of virtual items being equipped by or individually accessible to the virtual object and respectively having virtual functions; and display a virtual assembled item in the virtual scene in response to a first trigger operation targeting at least two virtual items of the plurality of virtual items, the virtual assembled item being obtained by combining the at least two virtual items into a target virtual item, the target virtual item supporting a new virtual function, the new virtual function of the target virtual item being different from the virtual function of each of the at least two virtual items alone, and the new virtual function of the target virtual item being realized without switching the target virtual item by the virtual object.

* * * * *